(12) United States Patent
Amiruddin et al.

(10) Patent No.: US 9,159,990 B2
(45) Date of Patent: Oct. 13, 2015

(54) HIGH CAPACITY LITHIUM ION BATTERY FORMATION PROTOCOL AND CORRESPONDING BATTERIES

(75) Inventors: Shabab Amiruddin, Menlo Park, CA (US); Bing Li, Union City, CA (US)

(73) Assignee: Envia Systems, Inc., Newark, CA (US)

( * ) Notice: Subject to any disclaimer, the term of this patent is extended or adjusted under 35 U.S.C. 154(b) by 534 days.

(21) Appl. No.: 13/588,162

(22) Filed: Aug. 17, 2012

(65) Prior Publication Data
US 2013/0043843 A1 Feb. 21, 2013

Related U.S. Application Data

(63) Continuation-in-part of application No. 13/213,756, filed on Aug. 19, 2011, now Pat. No. 8,928,286.

(51) Int. Cl.
| | |
|---|---|
| H01M 10/44 | (2006.01) |
| H01M 10/46 | (2006.01) |
| H01M 4/131 | (2010.01) |
| H01M 4/36 | (2006.01) |
| H01M 10/0525 | (2010.01) |
| H01M 4/505 | (2010.01) |
| H01M 4/525 | (2010.01) |
| H01M 4/587 | (2010.01) |
| H01M 10/056 | (2010.01) |

(52) U.S. Cl.
CPC .............. *H01M 4/131* (2013.01); *H01M 4/362* (2013.01); *H01M 10/0525* (2013.01); *H01M 10/44* (2013.01); *H01M 4/505* (2013.01); *H01M 4/525* (2013.01); *H01M 4/587* (2013.01); *H01M 10/056* (2013.01); *Y02E 60/122* (2013.01)

(58) Field of Classification Search
CPC ..... H01M 10/44; H01M 10/46; H01M 4/131; H01M 2300/0014; H02J 7/00; H02J 7/007; H02J 7/042; Y02E 60/12; Y02E 60/124; Y02E 60/122
USPC .......... 320/107, 128, 130, 141, 160; 429/188, 429/206, 220, 223, 231.5
See application file for complete search history.

(56) References Cited

U.S. PATENT DOCUMENTS

| | | | |
|---|---|---|---|
| 5,514,488 A | 5/1996 | Hake et al. | |
| 6,053,953 A | 4/2000 | Tomiyama et al. | |
| 6,080,507 A | 6/2000 | Yu | |
| 6,094,033 A * | 7/2000 | Ding et al. | 320/132 |
| 6,171,723 B1 | 1/2001 | Loch et al. | |
| 6,235,427 B1 | 5/2001 | Idota et al. | |
| 6,251,822 B1 | 6/2001 | Peng et al. | |
| 6,337,156 B1 | 1/2002 | Narang et al. | |
| 6,383,687 B1 | 5/2002 | Gibbons et al. | |
| 6,420,071 B1 | 7/2002 | Lee et al. | |
| 6,428,933 B1 | 8/2002 | Christensen et al. | |
| 6,468,690 B1 | 10/2002 | Barker et al. | |
| 6,475,680 B1 | 11/2002 | Arai et al. | |
| 6,511,767 B1 | 1/2003 | Calver et al. | |
| 6,528,208 B1 | 3/2003 | Thackeray et al. | |
| 6,616,715 B2 | 9/2003 | Kitoh et al. | |
| 6,677,082 B2 | 1/2004 | Thackeray et al. | |
| 6,680,143 B2 | 1/2004 | Thackeray et al. | |
| 6,682,849 B2 | 1/2004 | Narang et al. | |
| 6,703,163 B2 | 3/2004 | Ogura et al. | |
| 6,730,429 B2 | 5/2004 | Thackeray et al. | |
| 6,749,648 B1 | 6/2004 | Kumar et al. | |
| 6,783,896 B2 | 8/2004 | Tsujioka et al. | |
| 6,787,267 B2 | 9/2004 | Tsujioka et al. | |
| 6,787,268 B2 | 9/2004 | Koike et al. | |
| 6,790,243 B2 | 9/2004 | Vaidyanathan | |
| 6,855,460 B2 | 2/2005 | Vaughey et al. | |
| 6,858,349 B1 | 2/2005 | Luo et al. | |
| 6,884,546 B1 | 4/2005 | Fujita et al. | |
| 6,936,382 B2 | 8/2005 | Mikhaylik et al. | |
| 6,951,699 B2 | 10/2005 | Yata et al. | |
| 6,964,828 B2 | 11/2005 | Lu et al. | |
| 7,026,074 B2 | 4/2006 | Chen et al. | |
| 7,033,702 B2 | 4/2006 | Dasgupta et al. | |
| 7,078,128 B2 | 7/2006 | Lu et al. | |
| 7,135,252 B2 | 11/2006 | Thackeray et al. | |

(Continued)

FOREIGN PATENT DOCUMENTS

| | | |
|---|---|---|
| JP | 07-065825 | 3/1995 |
| JP | 09-045373 | 2/1997 |

(Continued)

OTHER PUBLICATIONS

Ito et al., Cyclic deterioration and its improvement for Li-rich layered cathode material Li [Ni0.17Li0.2Co0.07Mn0.56]O2, Journal of Power Sources, 195:567-573 (2010).
Ito et al., "A new approach to improve the high-voltage cyclic performance of Li-rich layered cathode material by electrochemical pre-treatment," Journal of Power Sources, 183:344-346 (2008).
(31-TW-01) Office Action from corresponding Taiwan Patent Application No. 101130151, with a translation of the Search Report completed on Mar. 28, 2014.
"Battery Test Manual for Plug-In Hybrid Electric Vehicles," prepared for the U.S. Department of Energy, Office of Energy Efficiency and Renewable Energy, Vehicle Technologies Program, 2008.

(Continued)

*Primary Examiner* — Edward Tso
(74) *Attorney, Agent, or Firm* — Dardi & Herbert, PLLC; Peter S. Dardi

(57) ABSTRACT

Battery formation protocols are used to perform initial charging of batteries with lithium rich high capacity positive electrode to result a more stable battery structure. The formation protocol generally comprises three steps, an initial charge step, a rest period under an open circuit and a subsequent charge step to a selected partial activation voltage. The subsequent or second charge voltage is selected to provide for a desired degree of partial activation of the positive electrode active material to achieve a desired specific capacity while providing for excellent stability with cycling. The formation protocol is particularly effective to stabilize cycling for compositions with moderate lithium enrichment.

30 Claims, 14 Drawing Sheets

(56) References Cited

U.S. PATENT DOCUMENTS

| | | |
|---|---|---|
| 7,166,385 B2 | 1/2007 | Ishida et al. |
| 7,186,479 B2 | 3/2007 | Krasnov et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,907 B2 | 8/2007 | Takeuchi et al. |
| 7,273,682 B2 | 9/2007 | Park et al. |
| 7,338,734 B2 | 3/2008 | Chiang et al. |
| 7,351,494 B2 | 4/2008 | Hennige et al. |
| 7,368,071 B2 | 5/2008 | Dahn et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,465,519 B2 | 12/2008 | Tang et al. |
| 7,497,285 B1 | 3/2009 | Radev |
| 7,507,503 B2 | 3/2009 | Amine et al. |
| 7,510,803 B2 | 3/2009 | Adachi et al. |
| 7,544,443 B2 | 6/2009 | Fujihara et al. |
| 7,575,830 B2 | 8/2009 | Kawamura |
| 7,718,306 B2 | 5/2010 | Cheon et al. |
| 2002/0034678 A1 | 3/2002 | Shibuya et al. |
| 2002/0037458 A1 | 3/2002 | Yamaguchi et al. |
| 2002/0102462 A1 | 8/2002 | Huggins et al. |
| 2002/0122973 A1 | 9/2002 | Manev et al. |
| 2003/0077515 A1 | 4/2003 | Chen et al. |
| 2003/0087155 A1 | 5/2003 | Cho et al. |
| 2003/0099883 A1 | 5/2003 | Ochoa et al. |
| 2003/0157014 A1 | 8/2003 | Wang et al. |
| 2004/0072072 A1 | 4/2004 | Suzuki et al. |
| 2004/0151951 A1 | 8/2004 | Hyung et al. |
| 2004/0161669 A1 | 8/2004 | Zolotnik et al. |
| 2004/0191630 A1 | 9/2004 | Kawamura et al. |
| 2005/0019670 A1 | 1/2005 | Amine et al. |
| 2005/0026037 A1 | 2/2005 | Riley, Jr. et al. |
| 2005/0031942 A1 | 2/2005 | Hennige et al. |
| 2005/0079422 A1 | 4/2005 | Ko et al. |
| 2005/0202316 A1 | 9/2005 | Hwang et al. |
| 2006/0051671 A1 | 3/2006 | Thackeray et al. |
| 2006/0051673 A1 | 3/2006 | Johnson et al. |
| 2006/0099472 A1 | 5/2006 | Hsu |
| 2006/0147809 A1 | 7/2006 | Amine et al. |
| 2006/0159994 A1 | 7/2006 | Dahn et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0148544 A1 | 6/2007 | Le |
| 2007/0148549 A1 | 6/2007 | Kobayashi et al. |
| 2007/0229034 A1 | 10/2007 | Tatebayashi et al. |
| 2008/0008933 A1 | 1/2008 | Lampe-Onnerud |
| 2008/0026297 A1 | 1/2008 | Chen et al. |
| 2008/0231237 A1 | 9/2008 | Kishi et al. |
| 2008/0261115 A1 | 10/2008 | Saito et al. |
| 2008/0318122 A1 | 12/2008 | Sun |
| 2009/0092900 A1 | 4/2009 | Obana et al. |
| 2009/0106970 A1 | 4/2009 | Fan et al. |
| 2009/0253042 A1 | 10/2009 | Sun et al. |
| 2009/0263707 A1 | 10/2009 | Buckley et al. |
| 2009/0263721 A1 | 10/2009 | Haruna et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0105007 A1 | 5/2012 | Amiruddin et al. |
| 2012/0107680 A1 | 5/2012 | Amiruddin et al. |
| 2012/0295155 A1 | 11/2012 | Deng et al. |
| 2013/0157147 A1 | 6/2013 | Li et al. |

FOREIGN PATENT DOCUMENTS

| | | |
|---|---|---|
| JP | 10-255837 | 9/1998 |
| JP | 2000-012018 A | 1/2000 |
| JP | 2002-110167 A | 4/2002 |
| JP | 2002-270158 A | 9/2002 |
| JP | 2003-223887 | 8/2003 |
| JP | 2003-242978 | 8/2003 |
| JP | 2004-234897 A | 8/2004 |
| JP | 2005-251684 | 9/2005 |
| JP | 2005-332707 A | 12/2005 |
| JP | 2007-066667 | 3/2007 |
| JP | 2010-103086 | 5/2010 |
| KR | 10-2001-0043360 A | 5/2001 |
| KR | 10-2003-0007651 A | 1/2003 |
| KR | 10-2005-0111764 A | 11/2005 |
| KR | 10-0578877 B1 | 5/2006 |
| KR | 10-0684724 B1 | 2/2007 |
| KR | 10-2010-0019933 A | 2/2010 |
| TW | 531924 | 5/2003 |
| TW | I251359 | 3/2006 |
| TW | I263369 | 10/2006 |
| WO | 01/35473 A1 | 5/2001 |
| WO | 01/91209 A1 | 11/2001 |
| WO | 03/021697 A2 | 3/2003 |
| WO | 2004/084330 A2 | 9/2004 |
| WO | 2005-031892 | 4/2005 |
| WO | 2005/083829 A2 | 9/2005 |
| WO | 2006/109930 A1 | 10/2006 |
| WO | 2006/137673 A1 | 12/2006 |
| WO | 2008/086041 A1 | 7/2008 |
| WO | 2009/022848 A1 | 2/2009 |

OTHER PUBLICATIONS

Evonik Industries, "Scientific breakthrough: SEPARION® opens up new markets for lithium ion batteries," http://corporate.evonik.de/en/company/news/lithium_ion_batteries/Pages/separion.aspx (Oct. 7, 2009).

Kang et al., "Enhancing the rate capability of high capacity xLi2MnO3—(1−x)LiMO2 (M=Mn, Ni Co) electrodes by Li—Ni—PO4 treatment," Electrochemistry Communications 11: 748-751 (2009).

Kang et al., "Layered Li(Li0.2Ni0.15+0.5zCo0.10Mn0.55-0.5z)O2-zFz cathode materials for Li-ion secondary batteries," Journal of Power Sources 146: 654-657 (2005).

Kim et al, "Synthesis of spherical Li[Ni(1/3-z)Co(1/3-z)Mn(1/3-z)Mgz]O2 as positive electrode material for lithium ion battery," Electrochimica Acta 51: 2447-2453 (2006).

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152(9): A1701-A1713 (2005).

Lee et al., "High capacity Li[Li0.2Ni0.2Mn0.6]O2 cathode materials via a carbonate co-precipitation method," Journal of Power Sources 162: 1346-1350 (2006).

Luo et al., "On the incorporation of fluorine into the manganese spinel cathode lattice," Solid State Ionics 180: 703-707 (2009).

Park et al., "Physical and electrochemical properties of spherical Li1+(Ni1/3Co1/3Mn1/3)1-xO2 cathode materials," Journal of Power Sources 177: 177-183 (2008).

Song et al., "Two-and three-electrode impedance spectroscopy of lithium-ion batteries," Journal of Power Sources 111: 255-267 (2002).

Sun et al, "AlF3-Coating to Improve High Voltage Cycling Performance of Li[Ni1/3Co1/3Mn1/3]O2 Cathode Materials for Lithium Secondary Batteries," Journal of the Electrochemical Society 154(3): A168-A172 (2007).

(56) References Cited

OTHER PUBLICATIONS

Sun et al, "Significant improvement of high voltage cycling behavior AlF3-coated LiCoO2 cathode," Electrochemistry Communications 8: 821-826 (2006).

Sun et al, "The preparation and electrochemical performance of solid solutions LiCoO2-Li2MnO3 as cathode materials for lithium ion batteries," Journal of Power Sources, 159: 1353-1359 (2006).

Thackeray et al., "Li2MnO3-stabilized LiMO2 (M=Mn, Ni, Co) electrodes for lithium-ion batteries," J. Mater. Chem. 17: 3112-3125 (2007).

Thackeray et al., "Comments on the structural complexity of lithium-rich Li1+xM1-xO2 electrodes (M=Mn, Ni, Co) for lithium batteries," Electrochemistry Communications 8: 1531-1538 (2006).

Woo et al., "Significant Improvement of Electrochemical Performance of AlF3-Coated Li[Ni0.8Co0.1Mn0.1]O2 Cathode Materials," Journal of the Electrochemical Society 154(11): A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters 9(5): A221-A224 (2006).

Search Report and Written Opinion for corresponding International Application No. PCT/US2012/051321 mailed Jan. 30, 2013.

* cited by examiner

HIGH CAPACITY LITHIUM ION BATTERY FORMATION PROTOCOL AND CORRESPONDING BATTERIES

CROSS REFERENCE TO RELATED APPLICATIONS

This application is a continuation-in-part of U.S. patent application Ser. No. 13/213,756 filed on Aug. 19, 2011 now U.S. Pat. No. 8,928,286 (published application 2012/0056590, hereinafter the '590 application) to Amiruddin et al., entitled "Very Long Cycling of Lithium Ion Batteries With Lithium Rich Cathode Materials," incorporated herein by reference.

FIELD OF THE INVENTION

The invention relates to initial charging for formation of lithium ion batteries with high specific capacity positive electrode active materials. The invention further relates to batteries formed using an improved formation protocol.

BACKGROUND OF THE INVENTION

Rechargeable lithium ion batteries, also known as secondary lithium ion batteries are desirable as power sources for a wide range of applications. Their desirability stems from their relative high energy density. The capacities of secondary lithium ion batteries have been greatly improved with the development of high capacity lithium rich metal oxides for use as positive electrode active materials. With cycling, however, secondary lithium ion batteries generally have decreased performance with increased cycle number. For some important applications, such as vehicle application, it is desired that secondary lithium ion batteries be able to charge and recharge for many cycles without a great loss of performance.

SUMMARY OF THE INVENTION

In a first aspect, the invention pertains to a method for the formation of a lithium ion secondary battery comprising a lithium rich metal oxide composition, a negative electrode, a separator between the positive electrode and negative electrode, and an electrolyte comprising lithium ions. The method comprises performing a first charge of the battery to a voltage from about 2.1 V to about 4.225V; after completing the first charge, holding the battery at an open circuit for a rest period of at least about 6 hours; and performing a second charge after the completion of the rest period to a voltage from about 4.275V to about 4.39V. In some embodiments, the first charge of the battery is to a voltage from about 2.5V to about 4.22V. In some embodiments, the battery is held at an open circuit rest period from about 8 hours to about 8 days. In some embodiments, the second charge after the rest period is to a voltage from about 4.28V to about 4.38V. The lithium rich metal oxide of the battery is approximately represented by x Li$_2$MnO$_3$·(1−x)LiNi$_u$Mn$_v$Co$_w$A$_y$O$_2$, wherein z=0 and the stoichiometry defines x, u, v, w and y in terms of b, α, β, γ and δ, and wherein 0.125≤x≤0.325. The negative electrode can comprise graphitic carbon. After charging the battery to 4.35V and storing the battery at an open circuit voltage for one week, the negative electrode of the battery comprises no more than about 125 ppm of the combination of Mn, Co and Ni. After cycling the battery for 2500 cycles between 4.24V to 2.73V at a 1 C charge and 2 C discharge, the battery maintains at least 92% of capacity. The electrolyte of the battery can comprise LiPF$_6$ and/or LiBF$_4$ at a total concentration from about 0.9M to about 2.5M and a solvent comprising ethylene carbonate and an organic solvent comprising dimethyl carbonate, methyl ethyl carbonate, γ-butyrolactone, γ-valerolactone or a combination thereof. In some embodiments, the electrolyte further comprises a lithium salt additive.

In a second aspect, the invention pertains to a lithium ion battery that comprises a positive electrode comprising an active material, a negative electrode, a separator between the positive electrode and negative electrode, and an electrolyte comprising lithium ions. The positive electrode active material comprises a lithium rich metal oxide that can be approximately represented by the formula Li$_{1+b}$Ni$_\alpha$Mn$_\beta$Co$_\gamma$A$_\delta$O$_{2-z}$F$_z$, where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. After charging the battery to 4.35V, storing the charged battery with an open circuit for a week and fully discharging the battery, the negative electrode comprises no more than about 150 ppm by weight manganese. In some embodiments, after charging the battery to 4.35V and storing the battery in an open circuit voltage for 1 week, the negative electrode of the battery comprises no more than about 135 ppm by weight manganese. In some embodiments, after charging the battery to 4.35V and storing the battery at an open circuit voltage for a week, the negative electrode of the battery comprises no more than about 200 ppm of the combination of Mn, Co and Ni. In some embodiments, the lithium rich metal oxide of the battery is approximately represented by x Li$_2$MnO$_3$·(1−x)LiNi$_u$Mn$_v$Co$_w$A$_y$O$_2$, wherein z=0 and the stoichiometry defines x, u, v, w and y in terms of b, α, β, γ and δ, with 0.125≤x≤0.325. In some embodiments, the lithium rich metal oxide of the positive electrode of the battery can have a stabilization coating. The negative electrode of the battery can comprise graphitic carbon. The electrolyte of the battery can comprise LiPF$_6$ and/or LiBF$_4$ at a total concentration from about 0.9M to about 2.5M and a solvent comprising ethylene carbonate and an organic solvent comprising dimethyl carbonate, methyl ethyl carbonate, γ-butyrolactone, γ-valerolactone or a combination thereof.

The positive electrode active material of the battery can have a discharge specific capacity at a rate of 2 C from 4.35V to 2.5V at the 10th discharge cycle that is at least about 140 mAh/g and that is at least 87.5% of the discharge specific capacity at a rate of C/5 from 4.35V to 2.5V at the 11th discharge cycle. When cycled at a rate of C/3 from 4.35V to 2.5V the positive electrode active material of the battery can have a discharge specific capacity at the 5th discharge cycle that is at least about 160 mAh/g and having a calendar life at an 85% state of charge at 30 degree C. of at least about 2 years based on discharge capacity decay of no more than about 20%. The lithium ion battery can have a discharge energy density of at least about 150 Wh/kg at a discharge rate of C/3 from 4.35V to 2V.

In a third aspect, the invention pertains to a lithium ion battery that comprises a positive electrode comprising a positive electrode material that comprises a lithium rich metal oxide composition; a negative electrode comprising a lithium intercalation/alloying composition; a non-aqueous electrolyte comprising lithium ions; and a separator between the negative electrode and the positive electrode. The battery has been cycled through a formation cycle and at the 200th charge/discharge cycle, the battery has a specific discharge capacity based on the mass of the lithium rich metal oxide composition of at least about 140 mAh/g at a discharge rate of 1 C from 4.35V to 2.0V that is at least about 97% of the 5th cycle specific discharge capacity. In some embodiments, the lithium rich metal oxide of the battery is approximately represented by x $Li_2MnO_3 \cdot (1-x)LiNi_uMn_vCo_wA_yO_2$, wherein z=0 and the stoichiometry defines x, u, v, w and y in terms of b, α, β, γ and δ, with 0.125≤x≤0.325. In some embodiments, the lithium rich metal oxide of the positive electrode of the battery can have a stabilization coating. The negative electrode of the battery can comprise graphitic carbon. The electrolyte of the battery can comprise $LiPF_6$ and/or $LiBF_4$ at a total concentration from about 0.9M to about 2.5M and a solvent comprising ethylene carbonate and an organic solvent comprising dimethyl carbonate, methyl ethyl carbonate, γ-butyrolactone, γ-valerolactone or a combination thereof.

The positive electrode active material of the battery can have a discharge specific capacity at a rate of 2 C from 4.35V to 2.5V at the 10th discharge cycle that is at least about 140 mAh/g and that is at least 87.5% of the discharge specific capacity at a rate of C/5 from 4.35V to 2.5V at the 11th discharge cycle. When cycled at a rate of C/3 from 4.35V to 2.5V the positive electrode active material of the battery can have a discharge specific capacity at the 5th discharge cycle that is at least about 160 mAh/g and having a calendar life at an 85% state of charge at 30 degree C. of at least about 2 years based on discharge capacity decay of no more than about 20%. The lithium ion battery can have a discharge energy density of at least about 150 Wh/kg at a discharge rate of C/3 from 4.35V to 2V.

In a fourth aspect, the invention pertains to a lithium ion battery that comprises a positive electrode comprising an active material, a negative electrode, a separator between the positive electrode and negative electrode, and an electrolyte comprising lithium ions. The positive electrode active material comprises a lithium rich metal oxide that can be approximately represented by the formula $Li_{1+b}Ni_\alpha Mn_\beta Co_\gamma A_\delta O_{2-z}F_z$, where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. The positive electrode has a discharge specific capacity at a rate of 2 C from 4.35V to 2.5V at the 10th discharge cycle that is at least about 140 mAh/g and that is at least 87.5% of the discharge specific capacity at a rate of C/5 from 4.35V to 2.5V at the 11th discharge cycle. The positive electrode active material of the battery can have a discharge specific capacity at a rate of 2 C from 4.35V to 2.5V at the 10th discharge cycle that is at least 89% to about 92.5% of the discharge specific capacity at a rate of C/5 from 4.35V to 2.5V at the 11th discharge cycle. In some embodiments, the lithium rich metal oxide of the battery can be approximately represented by x $Li_2MnO_3 \cdot (1-x)LiNi_uMn_vCo_wA_yO_2$, wherein z=0 and the stoichiometry defines x, u, v, w and y in terms of b, α, β, γ and δ, and 0.125≤x≤0.325. The negative electrode of the battery can comprise graphitic carbon.

In a fifth aspect, the invention pertains to a lithium ion battery that comprises a positive electrode comprising an active material, a negative electrode, a separator between the positive electrode and negative electrode, and an electrolyte comprising lithium ions. The positive electrode active material comprises a lithium rich metal oxide that can be approximately represented by the formula $Li_{1+b}Ni_\alpha Mn_\beta Co_\gamma A_\delta O_{2-z}F_z$, where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. The positive electrode active material of the battery can have a discharge specific capacity at a rate of C/3 from 4.35V to 2.5V at the 5th discharge cycle that is at least about 160 mAh/g and having a calendar life at an 85% state of charge at 30 degrees C. of at least about 2 years based on discharge capacity decay of no more than about 20%. In some embodiments, the positive electrode active material of the battery can have a calendar life at 30 degree C. of at least about 3 years based on discharge capacity decay of no more than about 20%. In some embodiments, the lithium rich metal oxide of the battery can be approximately represented by x $Li_2MnO_3 \cdot (1-x)LiNi_uMn_vCo_wA_yO_2$, wherein z=0 and the stoichiometry defines x, u, v, w and y in terms of b, α, β, γ and δ, and wherein 0.125≤x≤0.325. The negative electrode of the battery can comprise graphitic carbon.

DETAILED DESCRIPTION OF THE INVENTION

Figure 1:
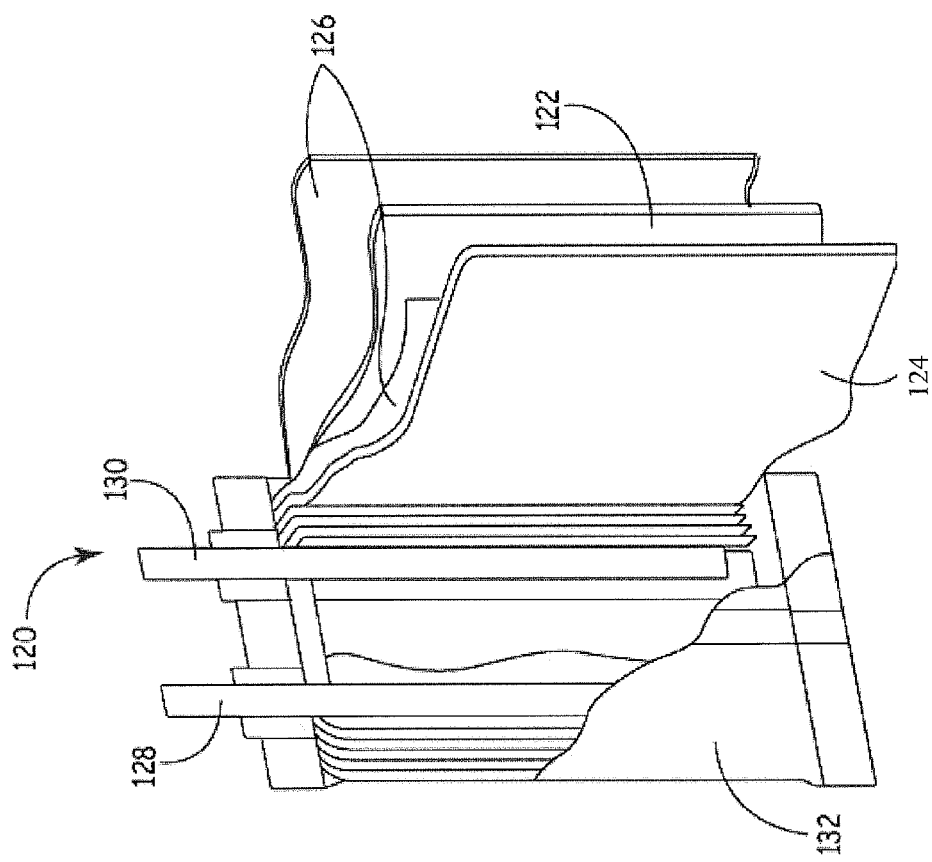
FIG. 1 is a schematic drawing of a pouch cell battery showing the inner electrode plates.

An improved approach is described for the activation or formation of a lithium ion battery comprising a high capacity positive electrode active material. During the first charge of a lithium ion battery, significant irreversible chemical changes take place within the battery, and the first charge of the battery can be referred to as a formation process in which the battery condition changes to a form for cycling. Thus, to achieve a stable formed battery, the first charge of the battery can be performed according to a specific process called a formation protocol, which can be designed to contribute to more stable cycling of the battery. The formation protocol herein is designed to take advantage of chemical changes taking place within the battery. For example, a solid electrolyte interface (SEI) layer forms around the anode active material, and the stability of the SEI layer is believed to be significant for stable cycling of the battery. With lithium rich high capacity positive electrode active materials, it has been found that significant structural changes also take place with respect to the positive electrode active materials also. Specifically, for the lithium rich positive electrode active materials described, the irreversible changes to the battery during the first charge can comprise activation of the material to make some phases of the material available for subsequent cycling. An improved formation protocol is described that is found to significantly stabilize the batteries during cycling as well as during storage. In particular, the formation protocol comprises an initial charge to a voltage from about 4.125V to about 4.225V, a rest period at an open circuit voltage and then a charge to a voltage from about 4.275V to about 4.4V.

In some circumstances, deterioration of the positive electrode active material during activation is found to result in decomposition of the material that results in dissolution of transition metals from the material into the electrolyte and ultimate migration of the transition metal atoms to the negative electrode. It can be expected that the decomposition of the positive electrode active material may result in lost capacity during cycling as well as possibly less stability during cycling. The measurement of the transition metal content in the negative electrode can be used as one measure of the stability of the positive electrode active material along with measurements of the rate of fade of capacity with cycling and/or changes in average voltage. Thus, improved battery performance can result from the improved battery formation protocol. Shelf life is also a significant commercial parameter for a battery, and the improved formation protocol can significantly improve the shelf life of a battery.

The difference between the first charge capacity and the first discharge capacity can be referred to as the irreversible capacity loss, and the irreversible capacity loss is a reflection of at least some of the first cycle irreversible changes in the battery. Generally the irreversible capacity loss is significantly greater than per cycle capacity loss at subsequent cycles. The irreversible capacity loss results in a corresponding decrease in the capacity, energy and power for the cell. With respect to the negative electrode during the first charge of the battery, a reaction involving the electrolyte results in the formation of a solvent electrolyte interphase layer associated with the negative electrode active material, and the presence of a stable SEI layer is believed to stabilize the battery with respect to electrolyte degradation during cycling. For lithium rich positive electrode active materials described herein, significant irreversible changes also take place with respect to the composition of the positive electrode active materials, and control of the irreversible changes to the positive electrode active materials can be used effectively to achieve very stable long term cycling properties. The formation protocol further provides control of the activation of the positive electrode active materials.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Generally, the batteries are formed with lithium ions in the positive electrode material such that an initial charge of the battery transfers a significant fraction of the lithium from the positive electrode material to the negative electrode (anode) material to prepare the battery for discharge. Unless indicated otherwise, performance values referenced herein are at room temperature.

When the corresponding batteries with intercalation-based positive electrode active materials are in use, the intercalation and release of lithium ions from the lattice induces changes in the crystalline lattice of the electroactive materials. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

The lithium ion batteries can use a positive electrode active material that is lithium rich relative to a reference homogenous electroactive lithium metal oxide composition. The class of lithium rich positive electrode active materials of interest can be approximately represented with a formula:

$$Li_{1+b}Ni_\alpha Mn_\beta Co_\gamma A_\delta O_{2-z}F_z, \tag{1}$$

where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. Element A and F (fluorine) are optional cation and anion dopants, respectively. Elements A can be, for example, Mg, Sr, Ba, Cd, Zn, Al, Ga, B, Zr, Ti, Ca, Ce, Y, Nb, Cr, Fe, V, or combinations thereof. The use of a fluorine dopant in lithium rich metal oxides to achieve improved performance is described in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference.

In some embodiments, it is believed that appropriately formed lithium-rich lithium metal oxides have a composite crystal structure. For example, in some embodiments of lithium rich materials, a layered $Li_2MO_3$ material may be structurally integrated with either a layered $LiM'O_2$ component, in which a reference structure has M and M' being manganese, although particular compositions of interest have a portion of the manganese cations substituted with other transition metal cations with appropriate oxidation states. In some embodiments, the positive electrode material can be represented in two component notation as x $Li_2MO_3$.(1−x)

LiM'O$_2$ where M' is one or more metal cations with an average valence of +3 with at least one cation being a manganese cation or a nickel cation, and where M is one or more metal cations with an average valence of +4. Generally, for compositions of particular interest, M can be considered to be Mn. The general class of compositions are described further, for example, in published U.S. patent application 2011/0052981A to Lopez et al. (the '981 application), entitled "Layer-Layer Lithium Rich Complex Metal Oxides With High Specific Capacity and Excellent Cycling," incorporated herein by reference.

The compositions expressed in the single component notation and two component notation can be related. Specifically, if b+α+β+γ+δ in formula (1) above is approximately equal to 1, the material can be a layered-layered material approximately represented by the formula x.Li$_2$MnO$_3$.(1−x)LiNi$_u$M-n$_v$Co$_w$A$_y$O$_2$, assuming for simplicity that z=0. With respect to the charging of a battery with the composite materials, the lithium manganese oxide (Li$_2$MnO$_3$) component of the compositions can undergo a reaction to release molecular oxygen with an associated release of 2 Li ions as indicated in equation (2):

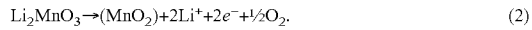

$$Li_2MnO_3 \rightarrow (MnO_2) + 2Li^+ + 2e^- + \tfrac{1}{2}O_2. \quad (2)$$

Upon discharge, the (MnO$_2$) composition takes up a single lithium ion and a single electron to form LiMnO$_2$ so that there is an overall significant decrease in capacity due to the irreversible reaction of the material during the initial charge. The product composition is written as (MnO$_2$) because it is not completely clear what this material is. While Eq. (2) is balanced if (MnO$_2$) is actually MnO$_2$, it is not clear if this is the precise reaction, although oxygen release is observed corresponding to a reduction of the metal. As discussed below, evidence suggests that the reaction schematically represented in Eq. (2) takes place efficiently at voltages above roughly 4.4 volts. Thus, with the lithium rich layered-layered material, during the first cycle charge above roughly 4.2V, decomposition of a Li$_2$MnO$_3$ component in the high capacity material can lead to oxygen loss and a significant irreversible capacity loss attributable to the positive electrode active material. The materials in principle can undergo other irreversible changes that may coincide with the initial charge step, such as a decomposition reaction Li$_2$MnO$_3$→MnO$_2$+Li$_2$O. Such a decomposition reaction does not result in a measured irreversible capacity loss since no electrons are generated that would be measured during the initial charge, but such a reaction to form inert lithium oxide could result in a loss of reversible capacity relative to the theoretical capacity for a particular weight of material. The initial reactions involving the active material are not completely understood. For example, evidence presented below indicates that only low levels of manganese dissolves into the electrolyte and migrates to the negative electrode if the battery is stabilized through the use of the multiple step partial activation formation protocol. Differential capacity results are consistent with the stabilization of the positive electrode found with the cycling data.

The formulas presented herein for complex lithium metal oxides are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

A two step formation protocol was previously found to stabilize batteries with lithium rich high capacity positive electrode active materials as described in published U.S. patent application 2011/0236751 to Amiruddin et al. (the '751 application), entitled "High Voltage Battery Formation Protocols and Control of Charging and Discharging for Desirable Long Term Cycling Performance," incorporated herein by reference. The teachings in the '751 application are based on the concept that high voltage activation is involved to provide for the observed high specific capacity of the active material. In contrast, the present formation protocol is designed to provide partial activation of the positive electrode active material for dramatically improved cycling with a reasonable portion of the specific capacity available for cycling. The outstanding cycling performance provides for both extremely stable capacity and average voltage out to over 1000 cycles with relatively high discharge rates. Thus, the batteries are suitable for higher power applications, such as certain vehicle applications. Evidence suggests that the partial activation formation protocol described herein stabilizes the positive electrode in addition to the negative electrode, and generally a short rest period within the multistep protocol can be used to obtain outstanding cycling stability.

The complex lithium rich metal oxides have been found to activate at higher voltages through the removal of lithium from a Li$_2$MnO$_3$-type phase. The behavior of the material with lithium extraction can be interrogated through differential capacity plots, which can identify changes in lithium extraction as a function of voltage. While the removal of lithium from the Li$_2$MnO$_3$ phase can be important to achieve high values of specific capacities of the material, the resulting phase(s) have been found to transform to unstable phases following activation. Thus, the high capacity lithium rich metal oxides can exhibit a capacity that decays faster than desired with cycling due to decomposition of the active material.

While some aspects of the material remain a mystery, tremendous progress has been achieved in understanding some of the extraordinarily complex chemistry and material science of the lithium rich layered-layered lithium metal oxides, as described in published U.S. patent application 2012/0056590 to Amiruddin et al. (the '590 application), entitled "Very Long Cycling of Lithium Ion Batteries With Lithium Rich Cathode Materials," incorporated herein by reference. Based on this further chemical understanding, fully activated material can be reasonably stabilized for long term cycling by operating the battery subsequent to activation in an appropriate voltage window. However, additional advantages are achieved through partial activation of the active material, and the advantages of partial activation are particularly pronounced for material with lower amounts of lithium enrichment.

The formation protocol described herein provides for the desirable and stable partial activation of the batteries. Specifically, the activation protocol described herein provides a balance with sufficient activation of the higher voltage Li$_2$MnO$_3$-type phases while not destabilizing the material. It has been discovered that the formation protocol can provide appropriate balancing of sufficient activation of the high voltage material to achieve desired initial capacities while leaving a sufficiently stable material with respect to cycling. For at least some vehicle applications, it is generally desirable to have no more than about 20% loss of power based on capacity and average voltage for more than 1000 charge/discharge cycles at relatively high rates. An appropriate balance can be found with relatively high discharge capacities and long cycling stabilities with respect to both capacity and average voltage.

While the maximum voltage during a first cycle formation charge does not need to be the same as the charge voltage during cycling, it has been found that a moderate formation voltage can sufficiently activate the material to achieve desired capacity, and that cycling over an appropriate voltage window with a charge voltage that does not significantly additionally activate the active material can be effective to achieve stable long term cycling. In other words, with sufficient activation to form the material at a desired capacity, the cycling voltage window can be selected to maintain the capacity for a very large number of cycles. The results are consistent with maintaining a significant fraction of an inactive $Li_2MnO_3$ phase within the material during cycling and that the $Li_2MnO_3$ phase in some way stabilizes the material to reduce unwanted phase transitions as the material is cycled through charging and discharging of the battery. Material instabilities can result from phase transitions of the activated materials as a result of cycling, as demonstrated in the '590 application.

The complex lithium rich metal oxide material is believed to initially have a layered-layered mixed phase material domains within individual particles with different stoichiometries. Activation induces partial phase changes, and cycling induces additional phase changes. Electrochemical measurements provide explicit evidence of multiple product phases that have not been clearly identified although the general nature of some of the phases can be reasonably guessed. The identification of the phases is extraordinarily difficult due to the extreme complexity of the materials along with the dynamic nature of the changes with cycling, the similarities of the x-ray diffractograms for significantly different phases and the multiphasic behavior generating small domains and overlapping domains that may not generate clear diffractions among other reasons. Thus, in many respects, the electrochemical data is a good tool presently for identifying the presence of various phases. Differential capacity plots in the '590 application in particular provide direct evidence of the properties of various phases and the phase evolution with cycling.

The formation protocol provides an initial charge step to a voltage of no more than about 4.2V. Due to the relatively low voltage during the initial charge, the differential capacity plots suggest that little activation takes place of the higher voltage phases of the positive electrode active material. After the first charge, the battery is stored in an open circuit configuration for a rest period. While not wanting to be limited by theory, it is believed that the SEI layer substantially forms by the end of the rest period. Partial activation of the positive electrode active material takes place during a subsequent charge step after the rest period. Additional activation of the high voltage phases of the material may or may not take place during cycling of the battery, and the degree of further activation during cycling may depend on the amount of lithium enrichment of the initial cathode material.

A rest period or second aging has been found to be important with respect to stable formation of the battery for subsequent cycling. Specifically, after an initial low voltage charge, the battery can be stored in an open circuit rest period which generally extends for at least six hours. With the partial activation described herein, a relatively shorter rest period can be effectively used to stabilize the battery for higher capacity cycling in comparison to the formation protocol with full activation described in the '751 application. The role of the rest period is not well understood, but experimental results indirectly suggest a thickening of the SEI layer. In any case, the performance results clearly show significance associated with the rest period. Also, a rest period that is too long also deteriorates the cycling performance significantly.

The second charge step after the rest period is selected to partially activate the positive electrode active material and to clearly avoid excessive activation. Thus, the second charge step is selected to have a voltage that is in the range from about 4.275V to about 4.39V. The selection of the full charge voltage allows for sufficient activation of the desired degree of capacity of the positive electrode active material while maintaining the desired stability of the material.

The positive electrode active material is stabilized by the improved formation protocol relative to a formation protocol involving a single charge during formation. The increased stability is suggested by the generation of a reduced amount of gaseous oxygen during the formation process. Gaseous oxygen can be associated with irreversible changes to the positive electrode active material. The production of gaseous oxygen is undesirable also from a production perspective since oxygen should be vented from a battery to avoid mechanical instability of the battery. The venting of the oxygen can be an undesirable production complication during the formation charge process if a significant amount of oxygen is released.

The stability of the positive electrode active material is further evidenced by the analysis of the battery after activation, which is consistent with the reduced release of oxygen during formation. It has been found that if the cathode material is unstable, manganese and to a lesser extent other transition metals dissolve into the electrolyte from the positive electrode, which results in eventual deposition in the negative electrode active material. Using the improved formation protocol described herein, the batteries can be activated with very low levels of transition metals found in the negative electrode active material. Specifically, after activation and storage of charged batteries as described further below, the negative electrode can comprise no more than about 150 ppm by weight manganese and no more than about 200 ppm by weight total transition metals not native to the negative electrode active material. The low dissolution of transition metals is consistent with the stability of the capacity with cycling over a large number of cycles. We note that while generally the results in the '590 application did not involve a two step formation protocol, the long term cycling results in the '590 application were obtained with the two step partial activation formation protocol described herein.

In addition to stabilizing the electrodes, the improved formation protocol also surprisingly improves the rate capability of the material. Thus, even at low cycle numbers, the batteries formed with the improved formation protocol exhibit surprisingly improved high rate specific capacities relative to fully activated batteries. The specific capacities generally decrease with discharge rate. The effect of discharge rate can be examined by the percent decrease in specific capacity as the rate increases. Since greater activation of the battery is believed to initially increase the capacity at the expenses of decreased cycling stability, it is surprising that the relative capacity increase from full activation can effectively decrease or essentially disappear for rate of 1 C, 2 C or higher relative to the partially activated batteries. In conventional notation, a rate of 1 C corresponds with the discharge of the battery over a one hour time period, while a rate of 2 C corresponds with discharge over ½ hour and C/3 corresponds with discharge of the battery over three hours. Thus, at high discharge rates, the batteries activated with the multiple step partial activation formation protocol exhibit surprisingly large specific capacities.

Also, the batteries formed with positive electrodes activated with the multiple step partial activation protocol described herein also exhibit a reduced DC resistance. The DC resistance is a measure of the internal electrical resistance within the battery, and a measurement procedure for the DC resistance is described in detail below. If the DC resistance of the battery is greater, more heat is generated by the battery during discharge and less energy is available from the battery for external work. In general, the values of the DC resistance are more significant at battery states of charge that are of most significance during actual use of the battery. Thus, for convenience, the DC resistance is examined below at a battery state of charge from 20% to 90%. Generally, the multiple step partial activation formation protocol can reduce the DC resistance over the state of charge from 20% to 90% by at least about 5% relative to batteries formed with full activation.

Using the partial activation formation protocol, it is also found that shelf life of the batteries is also significantly improved. For practical commercial batteries, the batteries should exhibit a reasonable shelf life. Upon storage of a battery prior to use, the battery can exhibit permanent loss of capacity. The permanent loss of capacity can be desired to be below a specific percent prior to determining that the battery is wasted. Since the formation step is performed under certain desirable conditions, lithium ion batteries are generally distributed following a formation cycle and possibly a few cycles of the battery. When properly formed, the batteries can then be stored at 30° C. for at least 24 months with degradation of the battery capacity of no more than about 10% permanent capacity loss. In general, a calendar life is desired with at least 70% capacity retention after storage for, for example, 5 years or 10 years at room temperature. For testing purposes, the batteries are stored after discharging a battery to an 80% state of charge, and similar storage can be performed for commercial batteries. The stored batteries are removed periodically and cycled to evaluate the permanent capacity loss. After a year of data collection at, for example, monthly increments, the incremental measurements can be extrapolated for the 5 years to 10 years to predict the calendar life.

The batteries in the examples involve graphitic carbon active materials in the negative electrodes. However, the improved performance of the positive electrode active materials through the manipulation and appropriate stabilization of the materials can be extended to other negative electrode active materials that intercalate or alloy with lithium. The electrodes can be assembled into appropriate battery formats.

In summary, the improved formation protocol with partial activation of the positive electrode active material can provide extremely stable cycling out to a large number of cycles, improved rate performance and desirable shelf life. The stabilized batteries formed with the particular formation protocol exhibit significant decreases in dissolution of manganese and other transition metals from the cathode as demonstrated through an examination of metal uptake into the anode. Thus, the improved formation protocol can be effectively used for the initial preparation of commercial batteries, including vehicle batteries, that are expected to have desirable performance out to a large number of charge/discharge cycles.

Lithium Ion Batteries

Lithium ion batteries generally comprise a positive electrode, a negative electrode, a separator between the negative electrode and the positive electrode and an electrolyte comprising lithium ions. The electrodes are generally associated with metal current collectors. Lithium ion batteries refer to batteries in which the negative electrode active material is a material that takes up lithium during charging and releases lithium during discharging. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors associated respectively with negative electrode and positive electrode. The basic battery structures and compositions are described in this section.

The nature of the negative electrode intercalation/alloying material influences the resulting voltage of the battery since the voltage is the difference between the half cell potentials at the cathode and anode. Suitable negative electrode (anode) lithium intercalation/alloying compositions can include, for example, graphite, synthetic graphite, coke, fullerenes, other graphitic carbons, niobium pentoxide, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq\frac{1}{3}$. The graphitic carbon and metal oxide negative electrode compositions take up and release lithium through an intercalation or similar process. Silicon and tin alloys form alloys with the lithium metal to take up lithium and release lithium from the alloy to correspondingly release lithium. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference. Desirable elemental silicon based negative electrode active materials are described in published U.S. patent application number 2011/0111294 filed on Nov. 3, 2010 to Lopez et al., entitled "High Capacity Anode Materials for Lithium Ion Batteries," incorporated herein by reference. Desirable silicon oxide based negative electrode active materials are described in copending U.S. patent application Ser. No. 13/108,708 filed on May 16, 2011 to Deng et al., entitled "Silicon Oxide Based High Capacity Anode Materials for Lithium Ion Batteries," incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidene fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, lithium bis-oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

Particularly useful electrolytes for high voltage lithium-ion batteries are described further in published U.S. patent application 2011/0136019 filed on Dec. 4, 2009 to Amiruddin et al. (the '019 application), entitled "Lithium Ion Battery With High Voltage Electrolytes and Additives," incorporated herein by reference. The high voltage electrolytes can comprise $LiPF_6$ and/or $LiBF_4$ at a total concentration from about 0.9M to about 2.5M and a solvent comprising ethylene carbonate and a liquid organic solvent comprising dimethyl carbonate, methyl ethyl carbonate, γ-butyrolactone, γ-valerolactone or a combination thereof. To stabilize the cycling properties of batteries with the electrolytes, the electrolytes can further comprise from about 0.01 weight percent to about 5 weight percent of a lithium salt additive, such as lithium difluoro oxalato borate or lithium bis(oxalato)borate or an organic additive, such as vinylene carbonate. Also, high voltage electrolytes with good low temperature behavior are described in copending U.S. patent application Ser. No. 13/325,367 to Li et al., entitled "Low Temperature Electrolyte for High Capacity Lithium Based Batteries," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 min in diameter and 65 mm long) and 26700 batteries (26 mm in diameter and 70 mm long), although other battery sizes can be used.

A schematic diagram of a pouch battery is shown in FIG. 1. Specifically, a pouch cell battery 120 is shown schematically having a negative electrode 122, a positive electrode 124 and a separator 126 between negative electrode 122 and positive electrode 124. A pouch battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 128, 130 associated respectively with negative electrode 122 and positive electrode 124. The stack of electrodes and separators can be enclosed in a laminated film casing 132. With respect to some specific embodiments, pouch batteries can be constructed as described in U.S. Pat. No. 8,187,752 to Buckley et al, entitled "High Energy Lithium Ion Secondary Batteries", and published U.S. patent application 2012/0028105 to Kumar et al., entitled, "Battery Packs for Vehicles and High Capacity Pouch Secondary Batteries for Incorporation Into Compact Battery Packs," both of which are incorporated herein by reference.

Cathode Active Material

The positive electrode active materials of particular interest comprise lithium rich compositions that generally are believed to form a layered-layered composite crystal structure. In some embodiments, the lithium metal oxide compositions specifically comprise Ni, Co and Mn ions with an optional metal dopant. A lithium rich composition can be referenced relative to a composition $LiMO_2$, where M is one or more metals with an average oxidation state of +3. Generally, the lithium rich compositions can be represented approximately with a formula $Li_{1+x}M_{1-y}O_2$, where M represents one or more non-lithium metals, x≥0, and y is related to x based on the average valence of the metals. When x is greater than 0, the composition is lithium rich relative to the reference $LiMO_2$ composition. In some embodiments, x is from about 0.01 to about 0.33, and y is from about x−0.2 to about x+0.2 with the proviso that y≥0. In the layered-layered composite compositions, x is approximately equal to y. In general, the additional lithium in the lithium rich compositions is accessed at higher voltages such that the initial charge takes place at a relatively higher voltage to access the additional capacity. However, as described herein the material can undergo irreversible changes during an initial high voltage charge step, such that the material that cycles subsequent to the initial charge is not the same material that reacts at high voltage in the initial material.

Lithium rich positive electrode active materials of particular interest can be represented approximately by a formula $Li_{1+b}Ni_\alpha Mn_\beta Co_\gamma A_\delta O_{2-z}F_z$, where b ranges from about 0.01 to about 0.3, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is a metal different from Mn, Ni, or Co, such as Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure. To simplify the following discussion in this section, the optional fluorine dopant is not discussed further, although the option of a fluorine dopant should still be considered for the particular embodiments. Desirable lithium rich compositions with a fluorine dopant are described further in published U.S. patent application 2010/0086854A to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in published U.S. patent application 2011/0052989A to Venkatachalam et al., entitled "Lithium Doped Cathode Material," incorporated herein by reference. The specific performance properties obtained with +2 metal cation dopants, such as $Mg^{+2}$, are described in copending U.S. patent application Ser. No. 12/753,312 to Karthikeyan et al., entitled "Doped Positive Electrode Active Materials and Lithium Ion Secondary Batteries Constructed Therefrom," incorporated herein by reference.

If b+α+β+γ+δ is approximately equal to 1, the positive electrode material with the formula above can be represented approximately in two component notation as x $Li_2M'O_3$.(1−x)$LiMO_2$ where 0<x<1, M is one or more metal cations with an average valence of +3 within some embodiments at least one cation being a Mn ion or a Ni ion and where M' is one or more metal cations, such as $Mn^{+4}$, with an average valence of +4. As noted above, it is believed that the corresponding material has two distinct physical phases related to the separate components of the two component notation. The multi-phased material is believed to have an integrated layered-layered composite crystal structure with the excess lithium supporting the stability of the composite material. For example, in some embodiments of lithium rich materials, a layered $Li_2MnO_3$ material may be structurally integrated with a layered $LiMO_2$ component where M represents selected non-lithium metal elements or combinations thereof.

Recently, it has been found that the performance properties of the positive electrode active materials can be engineered around the specific design of the composition stoichiometry. The positive electrode active materials of particular interest can be represented approximately in two component notation as x $Li_2MnO_3$.(1−x)$LiMO_2$, where M is one or more metal elements with an average valence of +3 and with one of the metal elements being Mn and with another metal element being Ni and/or Co. In general, 0<x<1, but in some embodiments 0.03≤x≤0.55, in further embodiments 0.075≤x≤0.50, in additional embodiments 0.1≤x≤0.4, and in other embodiments 0.125≤x≤0.325. A person of ordinary skill in the art will recognize that additional ranges within the explicit ranges of parameter x above are contemplated and are within the present disclosure. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In some embodiments, M can be written as $Ni_u Mn_v Co_w A_y$. For embodiments in which y=0, this simplifies to $Ni_u Mn_v Co_w$. If M includes Ni, Co, Mn, and optionally A the composition can be written alternatively in two component notation and single component notation as the following.

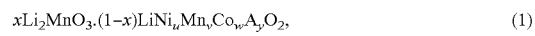

$$xLi_2MnO_3.(1-x)LiNi_u Mn_v Co_w A_y O_2, \quad (1)$$

$$Li_{1+b}Ni_\alpha Mn_\beta Co_\gamma A_\delta O_2, \quad (2)$$

with u+v+w+y≈1 and b+α+β+γ+δ≈1. The reconciliation of these two formulas leads to the following relationships:

$$b=x/(2+x),$$

$$\alpha=2u(1-x)/(2+x),$$

$$\beta=2x/(2+x)+2v(1-x)/(2+x),$$

$$\gamma=2w(1-x)/(2+x),$$

$$\delta=2y(1-x)/(2+x),$$

and similarly, $$x=2b/(1-b),$$

$$u=\alpha/(1-3b),$$

$$v=(\beta-2b)/(1-3b),$$

$$w=\gamma/(1-3b),$$

$$y=\delta/(1-3b).$$

In some embodiments, it may be desirable to have u≈v, such that Li $Ni_u Mn_v Co_w A_y O_2$ becomes approximately $LiNi_u Mn_u Co_w A_y O_2$. In this composition, when y=0, the average valence of Ni, Co and Mn is +3, and if u≈v, then these elements can have valences of approximately $Ni^{+2}$, $Co^{+3}$ and $Mn^{+4}$ to achieve the average valence. When the lithium is hypothetically fully extracted, all of the elements go to a +4 valence. A balance of Ni and Mn can provide for Mn to remain in a +4 valence as the material is cycled in the battery. This balance avoids the formation of $Mn^{+3}$, which has been associated with dissolution of Mn into the electrolyte and a corresponding loss of capacity. However, this perspective assumes maintenance of the two distinct phases with the phases remaining stable as the battery is cycled, and a more intricate view is described herein. In the partial activation formation protocol described herein, a significant fraction of the lithium remains following the charge process.

In further embodiments, the composition can be varied around the formula for the material with balanced amounts of Mn and Ni in the $LiMO_2$ phase of the material such that the approximate formula for the material is $x\ Li_2MnO_3 \cdot (1-x) LiNi_{u+\Delta}Mn_{u-\Delta}Co_wA_yO_2$, where the absolute value of $\Delta$ generally is no more than about 0.3 (i.e., $-0.3 \leq \Delta \leq 0.3$), in additional embodiments no more than about 0.2 ($-0.2 \leq \Delta \leq 0.2$) in some embodiments no more than about 0.175 ($-0.175 \leq \Delta \leq 0.175$) and in further embodiments no more than about 0.15 ($-0.15 \leq \Delta \leq 0.15$). With $2u+w+y \approx 1$, desirable ranges of parameters are in some embodiments $0 \leq w \leq 1$, $0 \leq u \leq 0.5$, $0 \leq y \leq 0.1$ (with the proviso that both $u+\Delta$ and w are not zero), in further embodiments, $0.1 \leq w \leq 0.6$, $0.1 \leq u \leq 0.45$, $0 \leq y \leq 0.075$, and in additional embodiments $0.2 \leq w \leq 0.5$, $0.2 \leq u \leq 0.4$, $0 \leq y \leq 0.05$. A person of ordinary skill in the art will recognize that additional ranges of composition parameters within the explicit ranges above are contemplated and are within the present disclosure. As used herein, the notation (value1≤variable≤value2) implicitly assumes that value 1 and value 2 are approximate quantities. The engineering of the composition to obtain desired battery performance properties is described further in the '981 application cited above.

In general, various processes can be performed for synthesizing the desired lithium rich metal oxide materials described herein having nickel, cobalt, manganese and additional optional metal cations in the composition and exhibiting the high specific capacity performance. In particular, for example, sol gel, co-precipitation, solid state reactions and vapor phase flow reactions can be used to synthesize the desired materials. In addition to the high specific capacity, the materials can exhibit a good tap density which leads to high overall capacity of the material in fixed volume applications. Specifically, lithium rich metal oxide compositions were used in coated forms to generate the results in the Examples below.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH \cdot H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. patent application 2010/0151332A (the '332 application) to Lopez et al. entitled "Positive Electrode Materials for High Discharge Capacity Lithium Ion Batteries", both incorporated herein by reference.

Coatings and Formation of Coatings on Positive Electrode Active Materials

Inorganic coatings, such as metal halide coatings and metal oxide coatings, on lithium rich positive electrode active materials have been found to significantly improve the performance of the resulting lithium ion batteries, although the coatings are believed to be inert with respect to battery cycling. Additionally, the specific capacity of the batteries also shows desirable properties with the coatings, and the irreversible capacity loss of the first cycle of the battery can be reduced in some embodiments. If the coating is properly designed, the coated materials can maintain desirable rate capability. These performance improvements can be similarly exploited in the improved cycling described herein.

With respect to metal oxide and metal halide coatings, a coating with a combination of metal and/or metalloid elements can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. Metal fluoride coatings are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium ion secondary batteries. See, for example, the '853 application and the '332 application cited above, as well as published U.S. patent application number 2011/0111298 (the '298 application) to Lopez et al., entitled "Coated Positive Electrode Materials For Lithium Ion Batteries," incorporated herein by reference. Desirable performance results for non-fluoride metal halide coatings have been described in published U.S. patent application 2012/0070725 to Venkatachalam et al., entitled "Metal Halide Coatings on Lithium Ion Battery Positive Electrode Materials and Corresponding Batteries," incorporated herein by reference. This patent application also discusses methods for formation of desired metal halide coatings.

An increase in capacity and a reduction in irreversible capacity loss were noted with $Al_2O_3$ coatings by Wu et al., "High Capacity, Surface-Modified Layered $Li[Li_{(1-x/3)}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. The use of a $LiNiPO_4$ coating to obtain improved cycling performance is described in an article to Kang et al. "Enhancing the rate capability of high capacity $xLi_2MnO_3$ (1−x)$LiMO_2$ (M=Mn, Ni, Co) electrodes by Li—Ni—$PO_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in published U.S. patent application 2011/0076556A to Karthikeyan et al., entitled "Metal Oxide Coated Positive electrode Materials for Lithium-Based Batteries," incorporated herein by reference.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of coating materials to achieve desired improvement in battery performance can be related to the particle size and surface area of the uncoated material. Further discussion of the effects of coating thickness on the performance properties for coated lithium rich lithium metal oxides is found in the '298 application cited above.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Formation Protocol with Partial Activation

The formation protocol described herein has been found to provide a more stable battery structure following the completion of initial irreversible changes to the battery during the first charge of the battery. The formation protocol comprises three steps, an initial charge step, a rest period under an open circuit and a subsequent charge step to a selected partial activation voltage. The formation protocol can be designed with additional charge steps and/or rest steps, if desired. The selected second charge voltage is selected to provide for a desired degree of partial activation of the positive electrode active material to achieve a desired specific capacity while providing for excellent stability with cycling. In comparison with a multiple step formation cycle with full activation significantly over 4.4V, evidence suggests a shorter rest period can be used to form the battery while providing for outstanding cycling of the battery, although the reasons for this difference is not presently understood. While the multiple step formation protocol with partial activation can be effectively used for the range of lithium enriched cathode active materials, the formation protocol is particularly effective to stabilize cycling for compositions with moderate lithium enrichment. In particular, for active compositions with x in Eq. 1 above of no more than about 0.325, partial activation with the multiple step protocol has been found to result in a battery material with excellent cycling out to thousands of charge/discharge cycles with relatively high specific capacities and excellent rate capability. In particular, for lithium enrichment corresponding to about x<0.325, the positive electrode active material exhibits partial activation at a charge voltage of about 4.275V to about 4.39V with no significant further activation with cycling with a charge voltage at the partial activation voltage.

During the first cycle of a battery, the battery is prepared for subsequent cycling. In particular, it is believed that the battery electrodes undergo irreversible changes to the materials in the first cycle that can affect the performance characteristics of a battery. In light of these changes, the first charge/discharge cycle can be referred to as the formation or activation cycle, and the procedure for the first cycle can be referred to as the formation of the cell. For example, it is believed that during the formation cycle of a battery, compositions in the battery, e.g., a solvent composition and the electrolyte salt, can decompose and deposit on the negative electrode during charging and form a layer of material known as a solid electrolyte interphase (SEI) layer. If the resulting SEI layer is effectively stable, the SEI layer can reduce further electrolyte decomposition on subsequent charging cycles of the battery. On the other hand, where the SEI layer is not stably formed, successive charge cycles may further irreversibly consume the battery electrolyte material or a component thereof, and the decomposition of the electrolyte can lead to a shortened battery cycle lifetime.

For the lithium rich materials described herein, the positive electrode active materials also generally undergo irreversible changes during the first charge of the battery. These irreversible changes can contribute to the irreversible capacity loss of the battery, which can be greater than the irreversible capacity loss attributable to the SEI layer. It has been found that coating the lithium rich materials can result in a decrease in the irreversible capacity loss, presumably related to the irreversible changes to the positive electrode active material. Nevertheless, significant irreversible changes occur in relationship with the lithium rich composition, and the loss of molecular oxygen has been observed in this context. The two step partial activation protocol has been discovered to result in a decrease in the oxygen loss during the formation cycle as well as to greatly stabilize the material for cycling.

The multistep partial activation protocol described herein provides for improved stability of the resulting battery for cycling. The first charge step is believed to induce initial irreversible changes to the battery. In particular, the first charge can be performed to a voltage from about 2.1 V to about 4.225V, in further embodiments from about 2.5V to about 4.22V and in additional embodiments from about 2.75V to about 4.215V. The examples below demonstrate that for the electrolytes described herein, the electrolyte undergoes reduction at battery potentials above about 2.1V when the SEI layer is essentially formed in association with the anode active material. Thus, an initial charge to a battery voltage of at least about 2.1V can form the SEI layer during a first charge step. The initially charged battery can be stored in an open circuit voltage for a period of time, also referred to as rest period or aging, generally at least about 6 hours, in further embodiments from about 8 hours to about 8 days and in other embodiments, from about 10 hours to about 6 days. In general, the battery can be stored at a temperature from about 20° C. to about 75° C. In some embodiments, the rest period can be performed at room temperature, i.e., from 22° C. to 25° C. After the rest period, the partial activation charge can be performed to a voltage from about 4.275V to about 4.39V, in further embodiments from about 4.28V to about 4.38V and in additional embodiments from about 4.3V to about 4.365V. A person of ordinary skill in the art will recognize that additional ranges of rest parameters and voltage for the charges within the explicit ranges above are contemplated and are within the present disclosure.

As noted above, charging to a higher voltage is believed to activate higher voltage phases of the positive electrode active material to make these phases available for cycling. Some irreversible changes to the material may take place during this activation. The formation protocol described herein is designed to performed what is termed partial activation, which can be considered activation to voltages of no more than about 4.39V. With partial activation, significant available specific capacity of the positive electrode active material is not accessed during cycling. The charge voltage during cycling is generally no more than the partial activation voltage during the formation cycle. In the partial formation process, the activation of the positive electrode active material evidently substantially avoids formation of phases that are unstable with cycling so that very long term cycling stability can be achieved. For lower values of lithium enrichment, further activation does not take place during cycling of the batteries to charge voltages of no more than about 4.39V. However, for batteries formed with materials having a greater lithium enrichment of roughly x>0.3, the batteries can exhibit some additional gradual activation during cycling to a charge voltage of roughly 4.39V or greater. Some gradual activation may or may not be desirable depending on the overall stability of the capacity over sufficiently long term cycling of the battery.

The charging of the battery generally is performed through the application of a suitable voltage across the poles of the battery. The charging can be controlled in appropriate ways. For example, the charge steps can comprises, for example, constant current (CC) charging, constant voltage (CV) charging, and mixed charging methods. During a CC charging process, a battery is charged to the selected voltage value by introducing an approximately constant current through the battery until the selected voltage value is reached. In a CV charging process, a battery can be charged to the selected voltage value by applying a constant voltage across the battery until the open circuit voltage reaches the selected voltage value and/or until a selected cut off of induced current is reached with the induced current gradually decreasing and/or a selected period of time has passed. In general, the particular charging steps can be divided, if desired, into multiple steps with different constant currents and/or constant voltages used for the respective steps. For example, a constant current can be used for a portion of a charge step and a constant voltage can be used for another part of the charge step.

In general, the initial lower voltage charge can be performed under a constant current charge, a constant voltage charge or a combination thereof. Regardless of the charging approach, the parameters of the charge can be adjusted such that the overall rate of performing this charge is at least about 30 minutes, in further embodiments for at least about 45 minutes, in additional embodiments from about 1.0 hours to about 12 hours and in other embodiments from about 1.5 hours to about 8 hours. A person of ordinary skill in the art will recognize that additional charge rate ranges within the explicit ranges above are contemplated and are within the present disclosure.

Following the initial charge to the first selected voltage, it has been discovered that significantly improved cycling results can be obtained when the first charge/discharge cycle described herein comprises a rest period wherein a battery is held in an open circuit configuration for a particular duration. In an open circuit configuration, no charge flows between the poles of the battery. During this storage or rest period, further formation of the SEI layer may take place or other stabilizing changes may take place within the battery, although we do not wish to be limited by theory. If the SEI layer does become thicker with a longer rest period, the observation that the performance peaks as a function of rest period suggests that lithium movement through the SEI layer can be restricted if the SEI layer is too thick. Also, an SEI layer that is thicker than desirable may contribute dead weight to the battery. Since the selected voltage generally is appropriately selected, the formation of the SEI layer and/or other formation processes can take place under appropriate low voltage situations without undesirable irreversible changes that have been observed to take place at high voltages for the initial charge.

For a multistep formation protocol with full activation as described in the '751 application, evidence was presented that a longer rest period leads to a more stable and possibly thicker SEI layer. Specifically, based on differential scanning calorimeter measurements on the negative electrodes after formation indicated that the negative electrode composition did not undergo decomposition until higher temperatures if the SEI layer was formed over a longer open circuit rest period. The stability temperature was taken as the onset temperature, where the onset temperature is obtained by drawing a tangent through the inflection point along the leading edge of a peak of the DSC curve, and the onset temperature is the temperature at which the tangent line intersects the baseline that reflects the heat capacity of the material. Also, the tip or highest point of a peak in the DSC plot can provide another reference point. A peak generally indicates a change, e.g., decomposition, in the SEI layer associated with the negative electrode material. It is expected that more stabile SEI layers also result from the rest period during the multistep partial activation formation protocol described herein.

A subsequent charge step of a first charge/discharge cycle generally comprises charging a battery to a terminal voltage value that is at least as great as the specified fully charged cycling voltage of the battery, which generally follows the rest period. During the subsequent charge step, the battery is further activated with respect to increasing the capacity due to incorporation of additional lithium into the negative electrode active material. This voltage for the subsequent charge step is greater than the initial charge of the first charge cycle. Additionally, the terminal voltage in the partial activation formation protocol avoids overcharge conditions wherein a battery undergoes undesirable irreversible processes and possibly dangerous instabilities.

In general, while two charge steps are described herein to bring the battery up to a selected partial activation voltage, additional charge steps can be used to bring the battery up to the selected voltage for the first cycle. For example, three, four or more charging steps can be used to step the voltage up to the voltage for full activation. These additional steps can be used before the rest step, after the rest step or a combination thereof. However, if greater than two charge steps are used, one or a plurality of these charge steps generally combine to reproduce the conditions described above for the initial charge step with a rest prior to charge to the full cycling voltage. If a plurality of rest steps is used between charging steps, the rest steps may or may not be performed at the same temperature. Similarly, a rest step may not be performed at a constant temperature through the rest step, and the reference to a temperature of a rest step is considered the approximate average temperature unless indicated otherwise.

In some embodiments of the formation cycle, the initial charge can comprises a constant current charge to the selected initial charge voltage, which is followed after the rest period by the constant voltage formation step. A subsequent constant voltage charge step can be performed until the induced current falls below a selected cut off value, and such a charge generally can involve significant current flow at an open circuit voltage approximately equal to the constant charge voltage. In a constant current charging step of the formation cycle, the battery can be charged at a current from about C/40 to about 5 C, in other embodiments from about C/20 to about 3 C and in further embodiments from about C/15 to about 2 C, until a selected voltage value is reached. A person of ordinary skill in the art will recognize that additional ranges of current within the explicit ranges above are contemplated and are within the present disclosure. The subsequent charging step to activate the battery can be performed using a constant voltage charge, although a constant current can be used in principle. Use of the multiple step formation procedure described herein can improve the cycle life of high voltage lithium ion batteries.

After the activation charge, the battery is discharged to complete the first charge/discharge cycle. For example, the battery can be discharged relatively deeply to a voltage of 2 volts. In some embodiments, the battery is discharged to a voltage below 2.75 volts, in other embodiments to a voltage from 1.5 volts to 2.65 volts, in additional embodiments from about 1.75 to about 2.6 volts and in further embodiments from about 1.8 volts to about 2.5 volts. A person of ordinary skill in the art will recognize that additional ranges of discharge voltages within the explicit ranges above are contemplated and are within the present disclosure. The battery generally is then charged again when ready for use. The battery can be partially charged to a selected voltage for distribution.

Battery Performance

The multiple step partial activation formation protocol described herein can be effectively used to improve battery performance in meaningful ways that are significant for commercial use. The partial activation protocols can be used in conjunction with cycling over corresponding voltage windows to achieve outstanding long term cycling of the batteries, as described in the '590 application. As shown herein, the improved formation protocol provides for decreased positive electrode instability as determined by decrease transition metal dissolution, an improvement in the rate capability even though capacity of the active material is not accessed, a decrease in the DC resistance and an improvement in the calendar life. The improved performance of the batteries is particularly significant for application to vehicle propulsion.

It has been found that positive electrode instability can result in the decomposition of the metal oxide in the cathode, and in particular manganese ions can elute from the metal oxide if unstable phases are formed cycling. The transition metal that elute from the metal oxide into the electrolyte can diffuse then to the negative electrode where the metal ions can be deposited. The direct correlation of manganese migration to the negative electrode with depletion of metal from the positive electrode active material and development of pores in the positive electrode active material as a result of cycling has been described in published U.S. patent application 2012/0107680 to Amiruddin et al., entitled "Lithium Ion Batteries With Supplemental Lithium," incorporated herein by reference. The stability of the positive electrode following activation has been found to be much more stable using the multiple step partial activation formation protocol as evaluated by manganese dissolution. Specifically, after the second charge, following a zero time rest period, to 4.35V or to 4.6V at a rate of C/10, the batteries are stored for a week at 100% state of charge. The batteries are then fully discharged and disassembled to remove the anode. The anodes are then analyzed for metal content using inductively coupled plasma analysis. Using the multiple step partial formation protocol with a final charge to 4.35V, the manganese dissolution as determined by a measurement of metal in the anode can be no more than about 150 parts per million by weight (ppm), in further embodiments no more than about 135 ppm and in other embodiments from about 50 ppm to about 125 ppm by weight. In addition, the total amount of Mn, Co and Ni metal in the anode after 600 cycles from 4.35V to 2V can be no more than about 200 ppm by weight, in further embodiments no more than about 175 ppm, and in other embodiments from about 75 ppm to about 150 ppm by weight. A person of ordinary skill in the art will recognize that additional ranges of amounts of metal dissolution into the anode within the explicit ranges above are contemplated and are within the present disclosure.

With the partial activation of the positive electrode active material, lithium is left in the material at the charge voltage, which is a purposeful abandonment of some of the battery capacity in exchange for increased stability of the material. As the discharge rate is increased, the specific capacity of the lithium rich metal oxides decreases, which presumably is due to internal resistance in the material to lithium extraction from the material. It has been surprisingly discovered that the positive electrode active materials formed with the partial activation formation protocol can be formed into a battery that exhibits a significantly reduced decrease of capacity with increasing discharge rates relative to battery that is activated to a full activation voltage. For at least certain compositions, the battery activated with the multiple step partial formation can actually exhibit a higher specific capacity at high discharge rates, e.g., 2 C, than a corresponding battery formed with full activation to 4.6V. For example, the positive electrode active material can exhibit a specific discharge capacity from 4.35V to 2V at a rate of 2 C of at least about 140 mA, in further embodiments at least about 145 mAh/g and in additional embodiments from about 146 mAh/g to about 160 mAh/g. This rate capability can also be expressed as a smaller decrease in specific capacity with increasing rate, which tends to more directly reflect the rate capability with less influence from the particular stoichiometry of the material that can influence the numerical value of the specific capacity. Thus, the specific discharge capacity at a rate of 2 C from 4.35V to 2V can be at least about 87.5% of the specific discharge capacity at a rate of C/5 from 4.35V to 2V, in further embodiments at least about 88.5% and in other embodiments from about 89% to about 92.5% of the specific discharge capacity at a rate of C/5 from 4.35V to 2V. A person of ordinary skill in the art will recognize that additional ranges of specific capacity and relative specific capacities within the explicit ranges above are contemplated and are within the present disclosure.

It is also useful to evaluate the DC resistance profiles as a function of state of charge. In the Examples below, the DC resistance is evaluated for pouch batteries formed with a single cathode layer and a single anode layer, so the batteries are not designed for low impedance performance suitable for vehicle applications. Nevertheless, the relative values provide useful information of the effect on electrical resistance as a result of the formation protocols. The DC resistance is measured after the battery rests for an hour at the particular state of charge, and a short pulse is applied. The DC resistance then is defined as the change in voltage from the beginning of the pulse to the end of the pulse divided by the change in current at the beginning of the pulse and at the end of the pulse. In the Examples, a 17 second 5 C pulse is used for the evaluation of power in larger capacity pouch batteries. In comparison with a fully activation formation protocol, the multiple step partial activation formation protocol results in a decrease in electrical resistance in the battery of greater than about 10% across a state of charge from 10% to 90%.

The DC resistance directly influences the power output at the corresponding state of charge. Two different power values are calculated from the pulse measurements. A discharge power is defined as $V_{min}$ ($V_{ocv}-V_{min}$)/R, where $V_{min}$ is the lowest voltage during the pulse and $V_{ocv}$ is the open circuit voltage. The lower state of charge values are particularly significant for determining the operating state of charge for the battery in use. A regen power is defined as $V_{max}$ ($V_{max}-V_{ocv}$)/R, where $V_{max}$ is the maximum voltage during the application of the pulse. The regen power is generally considered as more significant at higher state of charge. With the partial activation formation protocol, the batteries surprisingly have greater discharge power at low states of charge even though the lower charge voltage would tend to lower the battery voltage. While the regen powers are lower for the partial activation formation protocol relative to the powers for batteries that are fully activated to 4.6V, the regen powers obtained for the batteries for the multiple step partial activation formation protocol are generally within acceptable ranges for vehicle applications.

With respect to the performance of partially activated batteries, the capacity may or may not increase with cycling over a moderate number of cycles as the battery continues gradual activation. With adjustment of the partial activation voltage and the cycling voltage, extremely flat capacities can be obtained out to several thousands of cycles. Thus, batteries with partial activation can exhibit a capacity retention corresponding to a capacity at the 500th discharge cycle that is at least about 90%, in further embodiments at least about 92.5% in other embodiments at least about 95%, in additional embodiments at least about 97.5% relative to the 5th cycle discharge capacity when discharged at a rate of C/3 from 4.25V to 2.0V. Similarly, the batteries can exhibit a capacity retention corresponding to a capacity at the 1000th discharge cycle that is at least about 87.5%, in further embodiments at least about 90%, in additional embodiments at least about 92.5% and in other embodiments at least about 95% relative to the 5th cycle discharge capacity when discharged at a rate of 2 C from 4.25V to 2.0V. Also, the batteries can exhibit a capacity retention corresponding to a capacity at the 2500th discharge cycle that is at least about 87%, in further embodiments at least about 90%, and in other embodiments at least about 92.5% relative to the 5th cycle discharge capacity when discharged at a rate of 2 C from 4.25V to 2.0V. Furthermore, a battery with partial activation discharged from 4.25V to 2.0V can exhibit at least about 87.5% at 500 cycles of the 5th cycle average voltage, in additional embodiments at least about 90%, in other embodiments at least about 92.5% and in further embodiments at least about 95% when discharged at a rate of C/3. Similarly, a battery with partial activation discharged from 4.25V to 2.0V can exhibit at least about 85% at 1000 cycles of the 5th cycle average voltage, in additional embodiments at least about 90% and in further embodiments at least about 95% when discharged at a rate of 2 C. Also, a battery with partial activation discharged from 4.25V to 2.0V can exhibit at least about 85% at 2500 cycles of the 5th cycle average voltage, in additional embodiments at least about 90% and in further embodiments at least about 95% when discharged at a rate of 2 C. A person of ordinary skill in the art will recognize that additional ranges of performance of batteries with partial activation within the explicit ranges above are contemplated and are within the present disclosure.

As shown herein, the batteries can also be cycled from 4.35V to 2V with outstanding cycling stability. Thus, the batteries can exhibit a coulombic efficiency corresponding with a discharge capacity at the 200th cycle at least about 97% of the 10th cycle discharge capacity, in further embodiments at least about 98% and in additional embodiments at least about 98.5% of the 10th cycle discharge capacity when cycled between 4.35V and 2V at a rate of 1 C at room temperature. When cycled at 45° C., the batteries can exhibit a coulombic efficiency corresponding with a discharge capacity at the 200th cycle at least about 96% of the 10th cycle discharge capacity, in further embodiments at least about 97% and in additional embodiments at least about 98% of the 10th cycle discharge capacity when cycled between 4.35V and 2V at a rate of 1 C. A person or ordinary skill in the art will recognize that additional ranges of coulombic efficiency within the explicit ranges above at 200 cycles are contemplated and are within the present disclosure.

The improvements in desired performance parameters for the positive electrode active material can be combined with corresponding improved battery designs to provide significant improvements in battery performance, especially for pouch batteries with a stack of electrodes that have relatively low proportion of weight and volume contributions from container materials. With carbon based negative electrode active materials, the lithium ion secondary battery can have a discharge energy density of at least about 150 Wh/kg at a discharge rate of C/3 from 4.35V to 2V, in further embodiments at least about 160 Wh/kg and in additional embodiments from about 180 Wh/kg to about 230 Wh/kg at a discharge rate of C/3 from 4.35V to 2V. Also, the battery can have a volumetric energy density of at least about 300 Wh/l (watt hours/liter), in further embodiments at least about 310 Wh/l and in additional embodiments from about 320 Wh/l to about 400 Wh/l. A person of ordinary skill in the art will recognize that additional ranges of energy density within the specific ranges above are contemplated and are within the present disclosure.

Also, the batteries formed with the multiple step partial activation formation protocol exhibit improved calendar life. The calendar life reflects how long a battery can be stored without an unacceptable drop in battery performance. Specifically, calendar life can be tested through storage of the battery in an open circuit at a specific temperature. A higher temperature storage test can be used to accelerate the calendar life evaluation. The evaluation of storage life at multiple temperatures can facilitate extrapolation of calendar life predictions. To perform the test, the battery is prepared with the first formation cycle and then charged to an 80% state of charge for storage, although alternative procedures can be used based on 100% state of charge, 60% state of charge or other selected value. Periodically, such as every month, the batteries are cycled once to determine the battery capacity, and then returned to an 80% state of charge for continued storage.

An end of calendar life can be set at a time at which the capacity of the battery drops a certain amount below the initial battery capacity. For vehicle battery applications, a target end of calendar life can be set when the battery capacity falls more than 20% below the initial battery capacity after 5 years of storage at room temperature, although a cutoff of 30% capacity loss can be used if desired and also a longer time period, such as 10 years, can similarly be used if desired. Also, the storage results at one year can be considered and extrapolated appropriately. Reasonable extrapolation can be based on appropriate trends in the capacity drop, such as a linear extrapolation for a linear decay. However, the permanent capacity loss measurements over the course of a year may not be linear, so only a portion of the time plot closer to the one year date can be used to obtain an appropriate extrapolation. A person of ordinary skill in the art will recognize that additional ranges of calendar life within the explicit ranges above are contemplated and are within the present disclosure.

EXAMPLES

Batteries constructed with selected HCMR™ positive electrode compositions were activated under one of three different formation protocols. In particular, pouch cell batteries with HCMR™ positive electrode and the graphite negative electrode were assembled and tested. The batteries were cycled under different formation protocols and the individual examples below describe the activation protocols and the corresponding performance results from the batteries.

The examples below in general use lithium rich HCMR™ lithium metal oxides that are approximately described generally above and specifically in Example 1 below. The HCMR™ lithium metal oxides are also generally referred to as the high capacity positive electrode material. Positive electrodes were formed from the high capacity positive electrode material powders by initially mixing it thoroughly with conducting carbon black (Super P™ from Timcal, Ltd, Switzerland) and graphite (KS 6™ from Timcal, Ltd). Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised at least about 75 weight percent active metal oxide, at least about 1 weight percent graphite, and at least about 2 weight percent polymer binder.

A negative electrode was formed from graphitic carbon or elemental lithium. The graphitic carbon based negative electrodes comprised at least about 75 weight percent graphite and at least about 1 weight percent acetylene black with the remaining portion of the negative electrode being polymer binder. The acetylene black was initially mixed with NMP solvent to form a uniform dispersion. The graphite and polymer were added to the dispersion to form a slurry. The slurry was applied as a thin-film to a copper foil current collector. A negative electrode was formed by drying the copper foil current collector with the thin wet film in vacuum oven at 110° C. for about two hours to remove NMP. The negative electrode material was pressed between rollers of a sheet mill to obtain a negative electrode with desired thickness. Elemental lithium negative electrodes were formed from lithium foil (FMC Lithium) having thickness of 125-150 microns.

An electrolyte was selected to be stable at high voltages, and appropriate electrolytes are described in published U.S. patent application 2011/0136019 to Amiruddin et al., entitled "Lithium Ion Battery With High Voltage Electrolytes and Additives," incorporated herein by reference.

For batteries with the lithium foil counter electrodes, the electrodes were placed inside an argon filled glove box for the fabrication of the coin cell batteries. Lithium foil (FMC Lithium) having thickness of roughly 125 micron was used as a negative electrode. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes.

For a first set of experiments, the electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. Coin cell batteries with graphite carbon as negative electrode were formed following similar procedures.

Pouch cell batteries were constructed with N+1 negative electrode plates alternating with N positive electrode plates such that a negative electrode plate was positioned at both ends of the stack, such as 22 negative electrode plates and 21 positive electrode plates, although different number of electrode plates can be used to form pouch cell batteries of different energy output based on cell design. Positive electrodes were formed as described above with the current collector coated on both sides and with a portion of the aluminum current collector left uncoated to serve as tab attachment points. Graphitic carbon electrode is used as negative electrode. In general, the negative electrodes have a surface area of about 3.1 cm×4.35 cm and the positive electrodes had a surface area of about 3 cm×4.25 cm. The positive and negative electrodes were alternately stacked and a single trilayer (polypropylene/polyethylene/polypropylene) micro-porous separator (2320 from Celgard, LLC, NC, USA) was folded in a Z-pattern with an appropriate electrode in each fold and a negative electrode at the surface of the folded structure so that a negative electrode is located at the ends of the stacks. Nickel and aluminum tabs were then attached to the negative and positive electrodes, respectively, and the stack was placed in a pouch bag and sealed at three edges. Electrolyte was then added to the stack through the fourth, open edge and the fourth edge was then sealed.

Example 1

Synthesis of Cathode Materials and Corresponding Electrodes and Batteries

High capacity cathode materials represented by formula x $Li_2MnO_3 \cdot (1-x)LiNi_uMn_vCo_wMg_yO_2$, were synthesized using a procedure disclosed in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference. The stoichiometry of cathode materials having compositions 1-2 are outlined in Table 1 below.

TABLE 1

| Composition | X | Mg | Mn (% transition metals) |
|---|---|---|---|
| 1 | 0.175 | 0 | 0.45 |
| 2 | 0.3 | 0.01 | 0.51 |

Compositions 1 to 2 were then used to construct corresponding positive electrodes, which were in turn used to construct corresponding sets of batteries with lithium metal counter electrodes using the procedure outlined above. Additionally, pouch cell batteries were constructed using the corresponding compositions 1 or 2 above against graphitic carbon counter electrode using the procedure outlined above. In general, three battery formation protocols outlined in Table 2 below were used to activate the batteries, and the results are presented in the following examples. Unless otherwise indicated, the formation protocols were performed with a seven day rest period between the first and second charge steps.

TABLE 2

| Formation protocol | 1st cycle (Max Voltage) | Other terms used |
|---|---|---|
| 1 | 4.6 V | Full activation |
| 2 | 4.35 V | Partial activation |
| 3 | 4.3 V | Partial activation |

All of the synthesized materials were coated with an aluminum halide stabilizing coating.

Example 2

Evaluation of Battery Performance Under Different Formation Protocols

Figure 2:
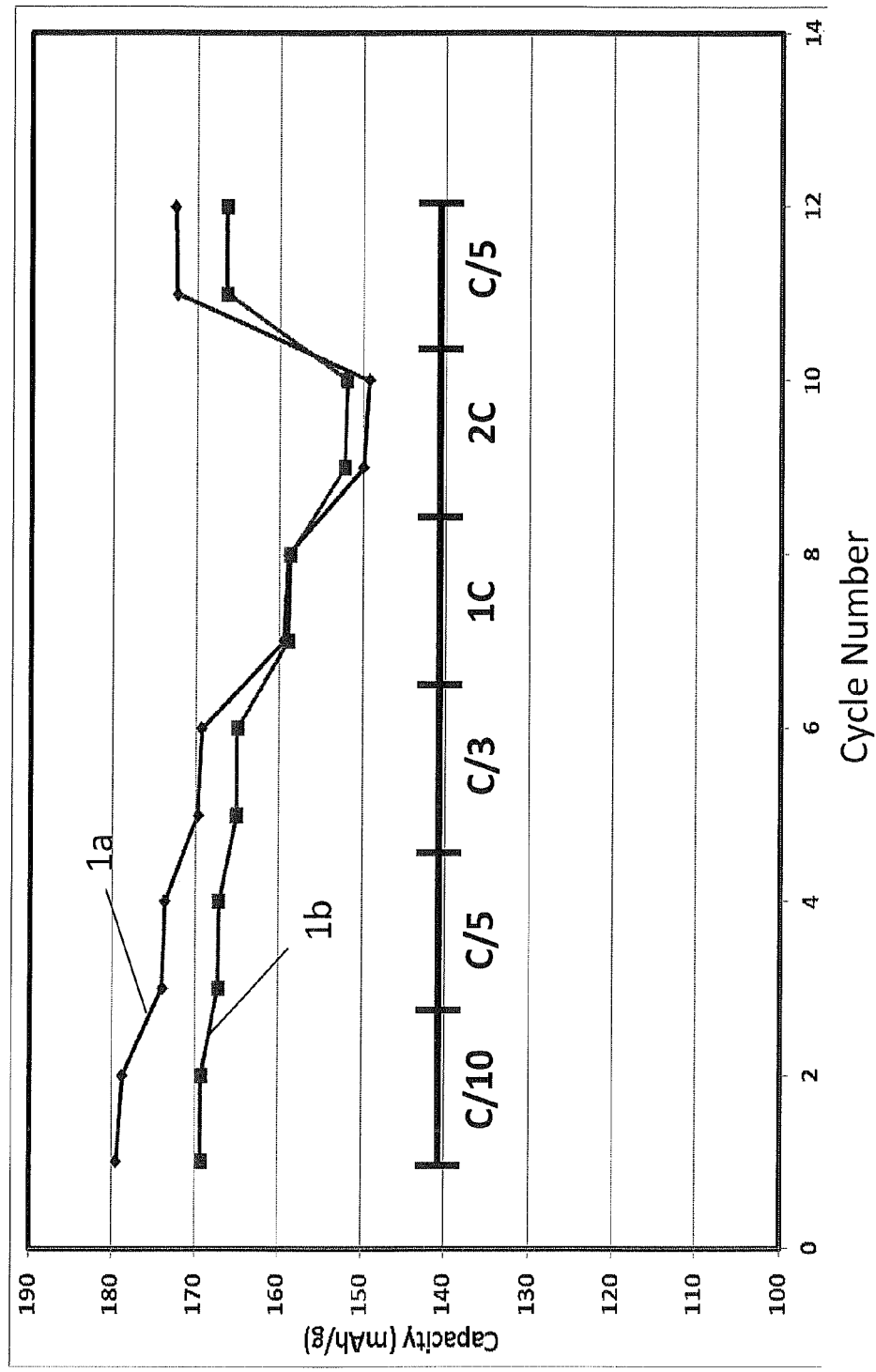
FIG. 2 is a plot of discharge capacities versus cycle numbers of batteries 1a and 1b at different discharge rates.

Coin cell batteries 1a and 1b formed from composition 1 of example 1 and a graphitic carbon counter electrode were activated under formation protocols 1 and 2 of table 2 above, respectively, i.e. battery 1a was activated at 4.6V and battery 1b was activated at 4.35V. The batteries were cycled at a rate of C/10 for the $1^{st}$ and $2^{nd}$ cycles, at a rate of C/5 for the $3^{rd}$ and $4^{th}$ cycles, at a rate of C/3 for the $5^{th}$ and $6^{th}$ cycles, at 1 C for cycles $7^{th}$ and $8^{th}$, at 2 C for cycles $9^{th}$ and $10^{th}$, and at C/5 for cycles $11^{th}$ and $12^{th}$, respectively between 4.35-2.5V and the results are plotted in FIG. 2. As shown in FIG. 2, battery 1a activated under formation protocol 1 had higher specific capacity than battery 1b activated under formation protocol 2, except for at rate 2 C. Thus, surprisingly, the battery with only partial activation actually exhibited a greater specific capacity than the battery with full activation at a high rate. This result seems to imply that the retention of some lithium at charging of the batteries under partial activation and corresponding maximum potentials provides stabilization structure that provides more facile lithium extraction at a higher rate.

Example 3

Evaluation of Batteries Based on Differential Capacity Plots

Figure 3:
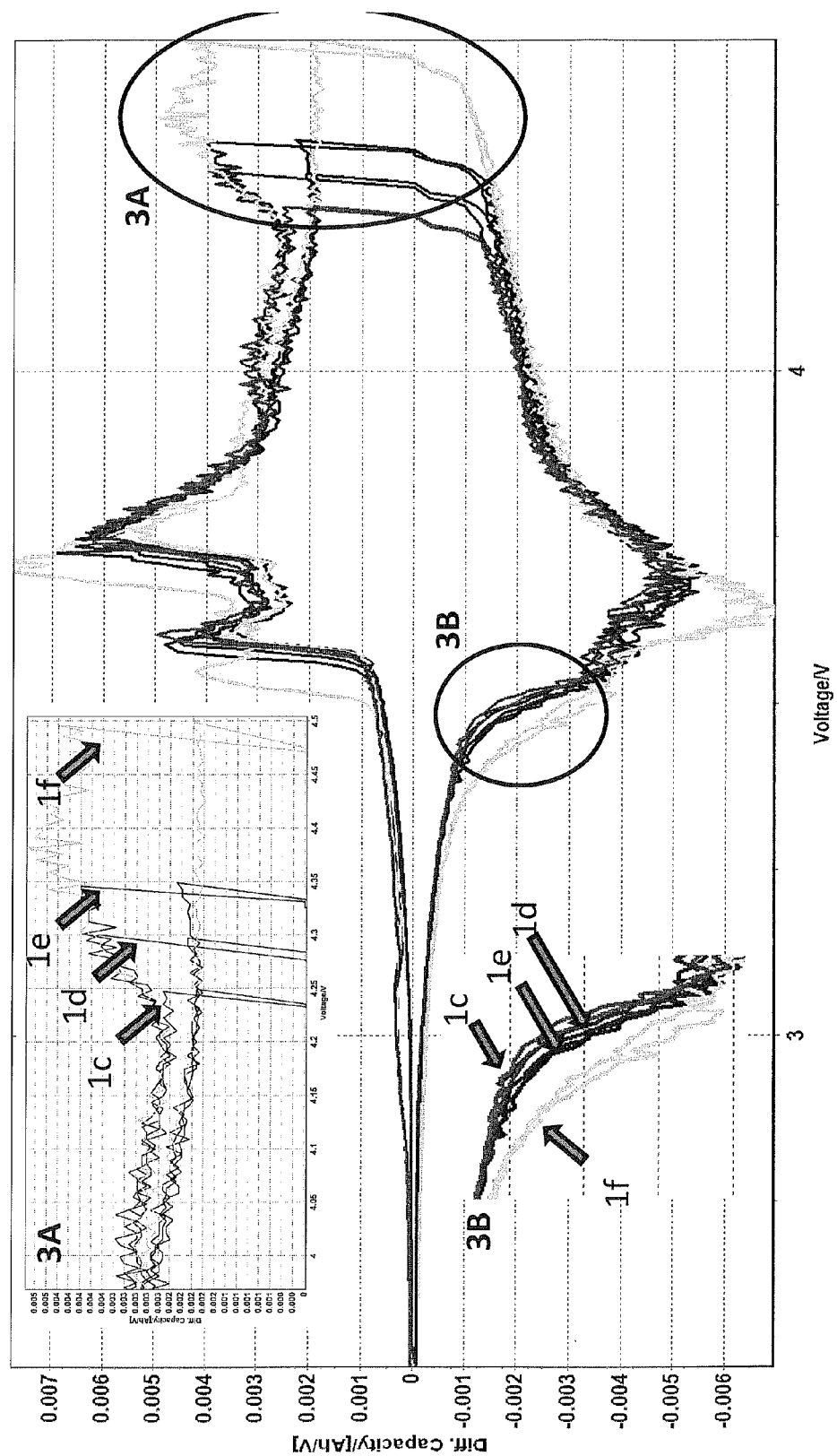
FIG. 3 is a plot of differential capacity versus voltage of batteries 1f with graphitic carbon electrode activated under different formation conditions with enlarged portions 3A and 3B showing changes of manganese activity.

Coin cell batteries 1c, 1d, 1e, and 1f formed from composition 1 of example 1 and graphitic carbon counter electrode were activated at 4.25V, 4.30V, 4.35V, and 4.5V respectively and tested for differential capacity. The results of differential capacity versus voltage are plotted in FIG. 3. As shown in FIG. 3, especially the enlarged portions 3A and 3B, manganese activity is suppressed when the batteries are cycled up to 4.35V (1e). However, when higher voltage such as 4.5V (1f) are used, there is an increase in Mn activity.

Coin cell batteries 1g, 1h, and 1j formed from composition 1 of example 1 and lithium foil counter electrode were activated using different formation protocol and procedures and tested for differential capacity. The results of differential capacity versus voltage are plotted in FIG. 4. Specifically, for battery 1g, the battery was charged to 4.4 V in the first cycle and discharged to 2.0 volts. In the second cycle, the batteries were charged again to 4.4 V. The second cycle did not show any activation. In the third cycle, the battery was charged to 4.45 V and discharged to 2.0 V where some activation was observed. For battery 1h, the battery was charged to 4.45 V in the first cycle and discharged to 2.0 volts. In the second cycle, the batteries were charged again to 4.45 V. The second cycle did not show any activation. In the third cycle, the battery was charged to 4.5 V and discharged to 2.0 V where some activation was observed. For battery 1j, the battery was charged to 4.6 V in the first cycle and discharged to 2.0 volts. In the second cycle, the batteries were charged again to 4.6 V. The second cycle did not show any activation. In the third cycle, the battery was charged to 5 V and discharged to 2.0 V where some more activation was observed.

Figure 4:
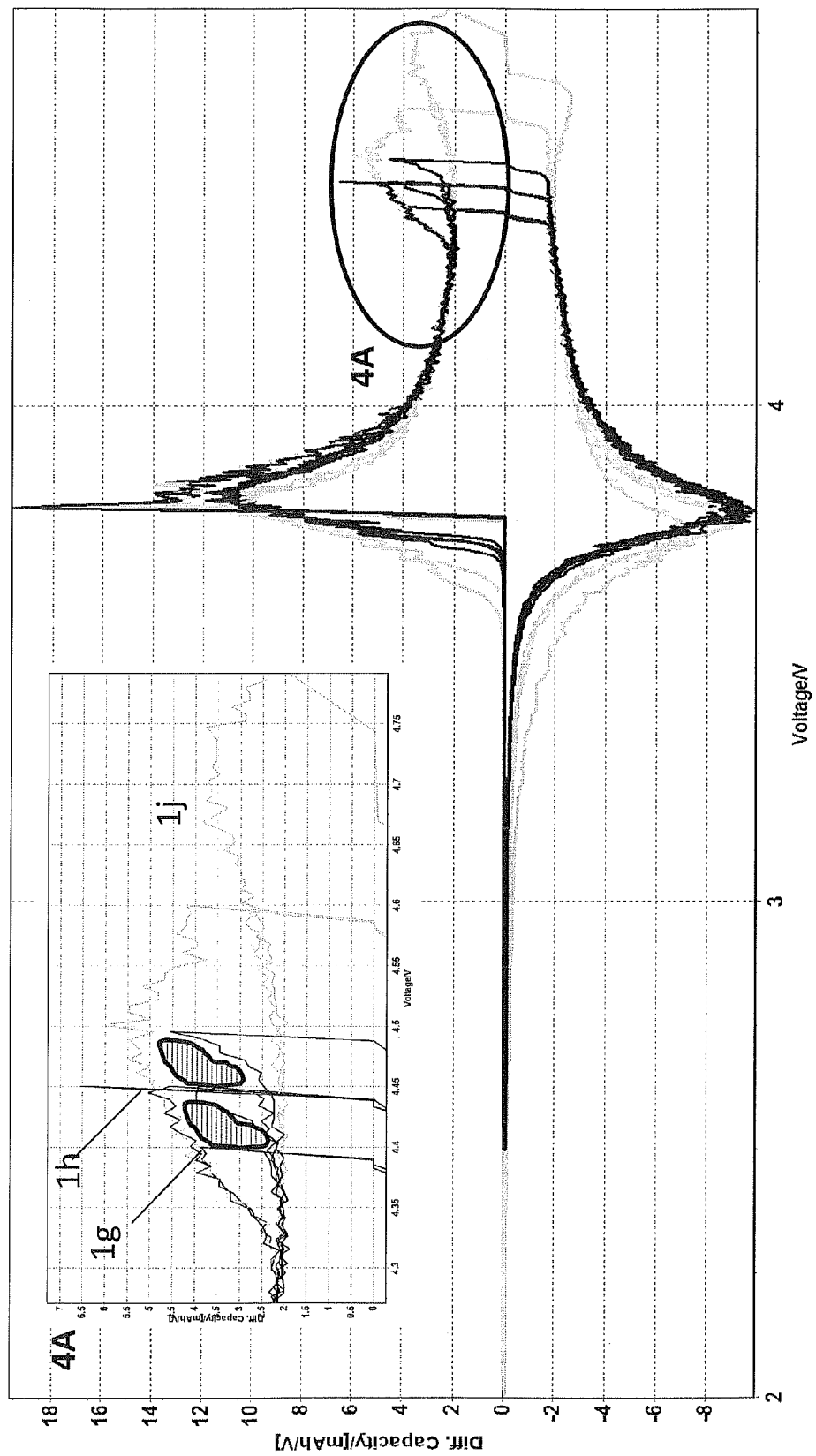
FIG. 4 is a plot of differential capacity versus voltage of batteries 1g-1j with lithium metal electrode activated under different formation conditions with enlarged portion 4A showing activation of $Li_2MnO_3$.

As shown in FIG. 4, especially the enlarged portion 4A, when the higher voltages are reached in one step rather than multiple steps, significant activation of $Li_2MnO_3$ is observed, which is indicated in FIG. 4A as shaded regions. The increased activation is noted graphically in FIG. 4A for batteries 1g and 1h roughly by the two marked out areas.

Example 4

Evaluation of Batteries Based on Transition Metal Dissolution

The dissolution of Mn and other transition metals following formation with either of formation protocols 1 or 2 was evaluated. Specifically, single layer pouch cell batteries with a single anode and a single cathode with a separator in between were constructed using composition 1. The batteries were charged to 4.3V, 4.35V or 4.6V at a rate of C/10 using a two step charge protocol, with a constant current charge to 4.2V and after a 0 time rest period with a second charge at constant voltage to the selected charge voltage. After formation, the battery is stored at 100% state of charge (SOC) for 1 week. The batteries were then discharged to 0% SOC based on the voltage windows outlined in Table 3. The fully discharged batteries were then disassembled and the anodes were removed and subjected to ICP analyses for transition metal concentrations and the results are listed in Table 3. The dissolution results demonstrated significantly more dissolution of Mn at higher or wider formation window.

TABLE 3

| Voltage window | Ni | Co | Mn | Formation Protocol |
|---|---|---|---|---|
| 4.5 to 2.0 | 29 | 32 | 190 | 1 |
| 4.35 to 2.0 | 57 | 51 | 185 | 1 |
| 4.35 to 2.5 | 15 | 8 | 68 | 2 |

TABLE 3-continued

| Voltage window | Ni | Co | Mn | Formation Protocol |
|---|---|---|---|---|
| 4.35 to 2.0 | 17 | 11 | 91 | 2 |
| 4.3 to 2.5 | 13 | 9 | 71 | 2 |
| 4.3 to 2.0 | 13 | 11 | 80 | 2 |

Example 5

Resistances of Batteries Formed with Different Formation Protocols

Single layer pouch cells 1k, 1l, and 1m formed from composition 1 of example 1 and graphitic carbon counter electrode were activated following formation protocols 1, 2, and 3 at 4.6V, 4.35V, and 4.3V respectively and tested for DC resistance (DCR).

Figure 5:
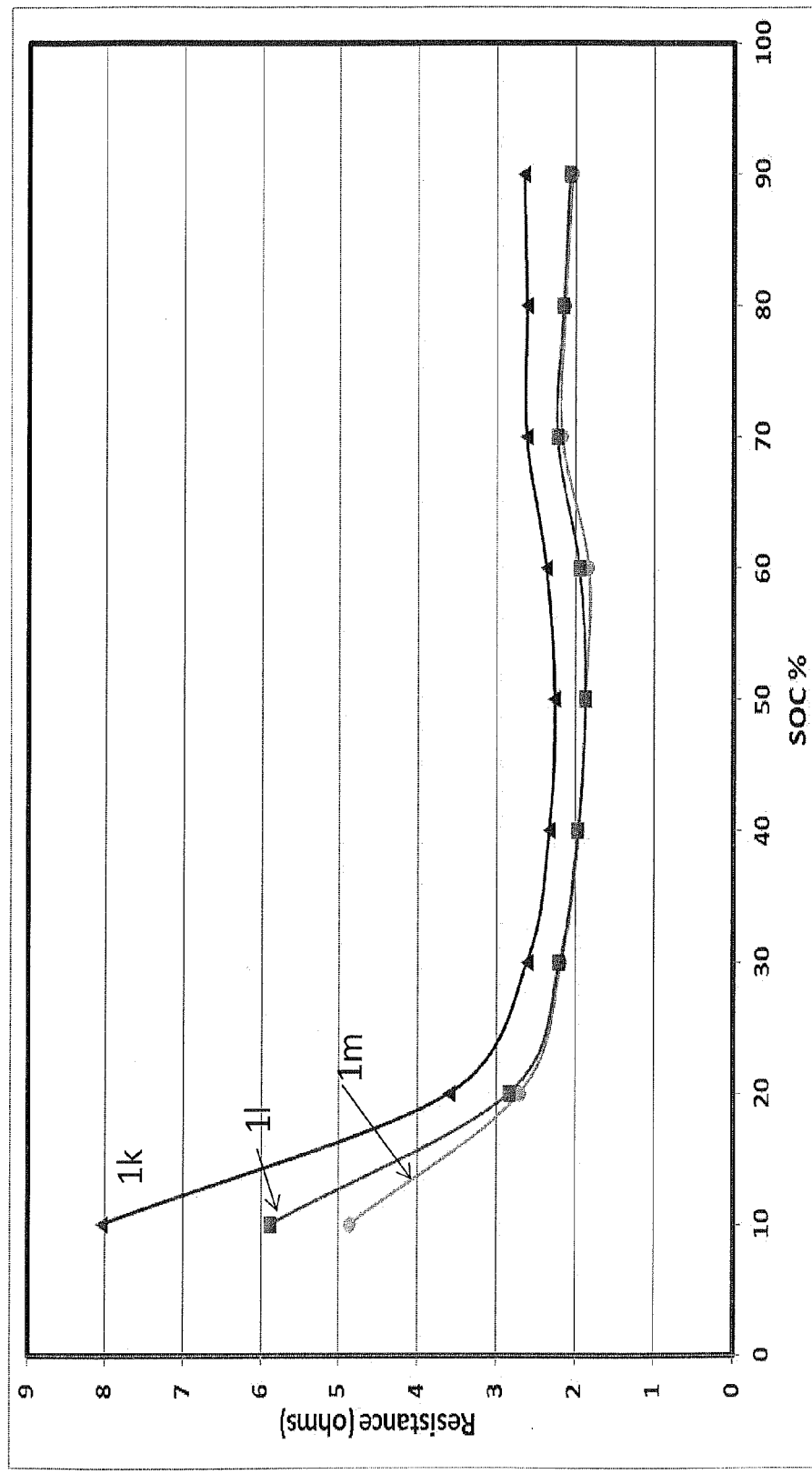
FIG. 5 is a plot of resistance versus percentage of state of charge (SOC %) of batteries 1k, 1l, and 1m formed under formation protocols 1, 2, and 3 respectively.

To perform further pulse testing, the battery is charged and then subjected to 1 C Pulse Test at room temperature (23° C.) with 10 second pulses. In the pulse test, the DC resistance was evaluated as a function of the state of charge starting from an initial 90% state of charge. The results of DC resistance in the pulse testing versus percentage of state of charge (SOC %) are plotted in FIG. 5, in which 100% state of charge was set at 4.35V for batteries formed with protocols 1 or 2 and at 4.3V for batteries formed with protocol 3. As shown in FIG. 5, all three batteries have DCRs below 4 ohm between 20% to 90% SOC, and battery 1k that went through full activation had elevated DC resistance relative to the batteries 1l and 1m that were subjected to the partial activation formation protocols.

Example 6

Battery Power Evaluation Based on State of Charge

Figure 6:
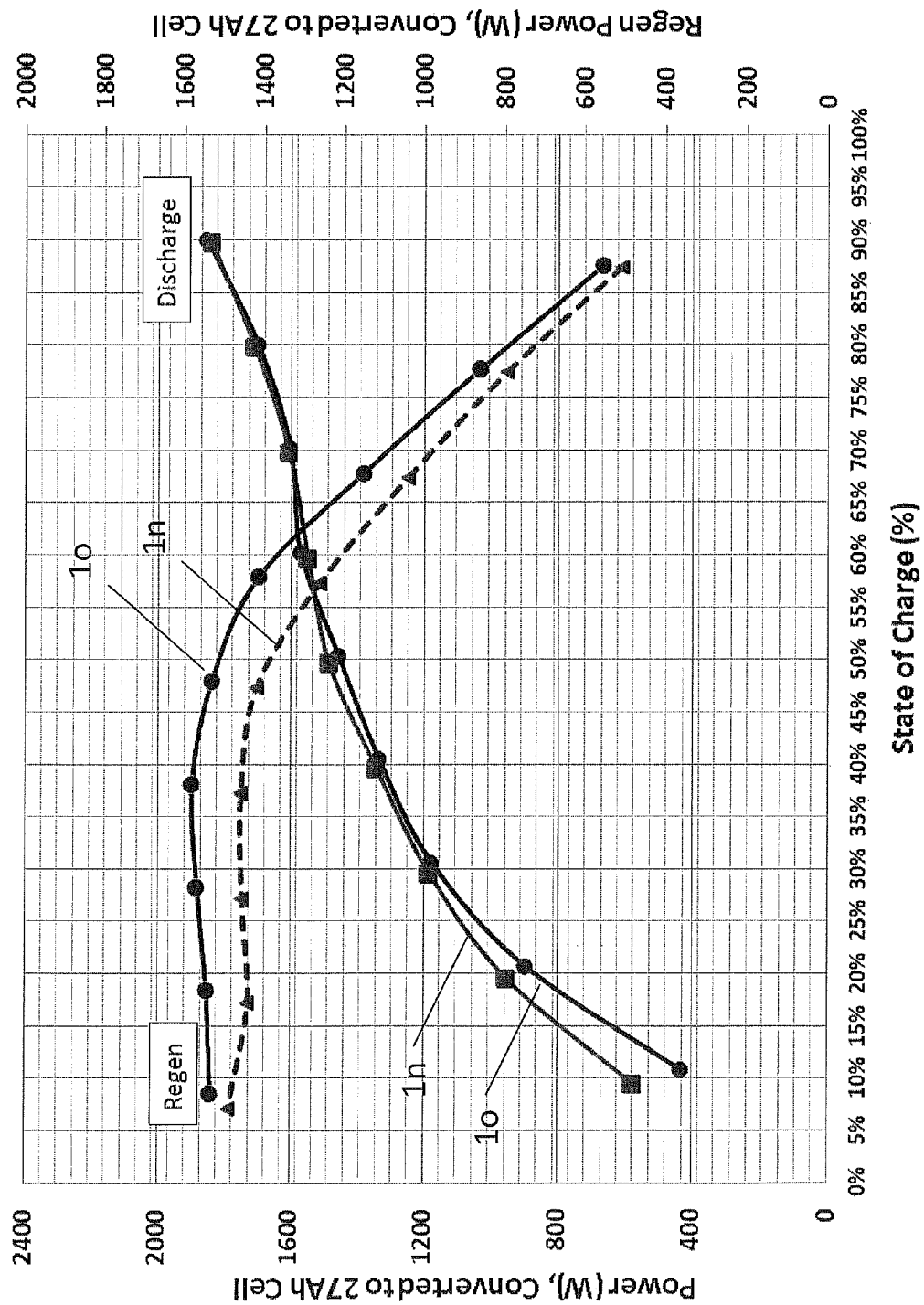
FIG. 6 is a plot of power versus SOC % of batteries 1n and 1o that has a design capacity of roughly 27 Ah.

Pouch cell batteries 1n and 1o with about 27 Ah capacities were formed from composition 1 of example 1 and graphitic carbon counter electrode following the procedures above. The pouch cell batteries 1n and 1o were activated at 4.35V or 4.6V respectively and then tested for Regen power and Discharge power at different percentages of state of charge. The evaluation of the different power values is described above before the Examples. Specifically, the batteries were discharged to a particular state of charge, for example from full charge 100% SOC to 90% SOC. The batteries were then allowed to rest for one hour with no current or voltage to equilibrate to its open circuit voltage (OCV). The batteries were then perturbed by a discharge pulse of 5 C magnitude for 17 seconds followed by a charge pulse of 3.75 C magnitude for 10 seconds. The drop in voltage during the discharge pulse and the rise in resistance in charge pulse of the batteries are recorded and used to evaluate the discharge power and Regen power of the batteries. The results of power versus percentage of state of charge (SOC %) are plotted in FIG. 6. As shown in FIG. 6, partially activated battery 1n showed higher power at lower stage of charge as the resistance is lower. For discharge power, lower stage of charge is particularly examined to determine the operating SOC for the battery. The discharge power is somewhat greater at lower SOC for the partially activated battery in comparison with the fully activated battery. Regen power, however, is usually considered at higher SOC with respect to battery performance. As shown in FIG. 6, the regen power is lower for the partially activated battery in, but the power achieved meets most electric vehicle and plug-in hybrid electric vehicle commercial targets.

Example 7

Evaluation of Batteries Formed with Different Formation Protocols

Figure 7:
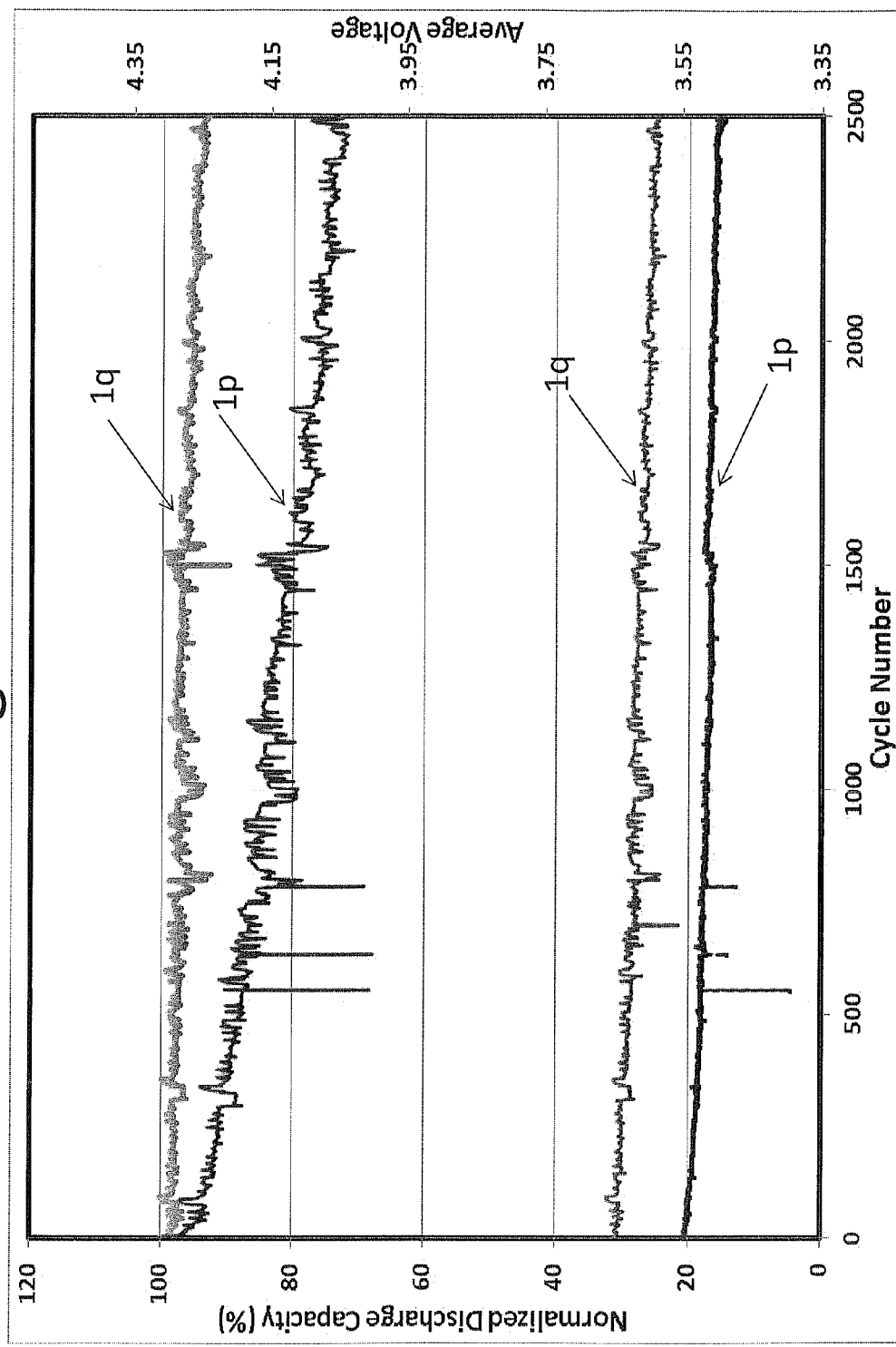
FIG. 7 is a plot of normalized discharge capacity and average voltage versus cycle number of batteries 1p and 1q cycled out to 2500 cycles.

Two pouch cell batteries 1p and 1q designed to have roughly 1 Ah total capacity formed from composition 2 of example 1 and graphitic carbon counter electrode were activated following formation protocols 1 and 2 at 4.6V and 4.35V respectively and cycled from 4.24V to 2.73V for 2500 cycles at a charge rate of 1 C and a discharge rate of 2 C. The results of normalized discharge capacity and average voltage versus cycle numbers are plotted in FIG. 7. As shown in FIG. 7, battery 1p activated with formation protocol 1 has significantly decreased capacity and average voltage over large number of cycles. The batteries formed with the partial activation protocol exhibited extremely stable capacity and average voltage for 2500 cycles.

Example 8

Calendar Life of Batteries at Different Temperatures

Figure 8:
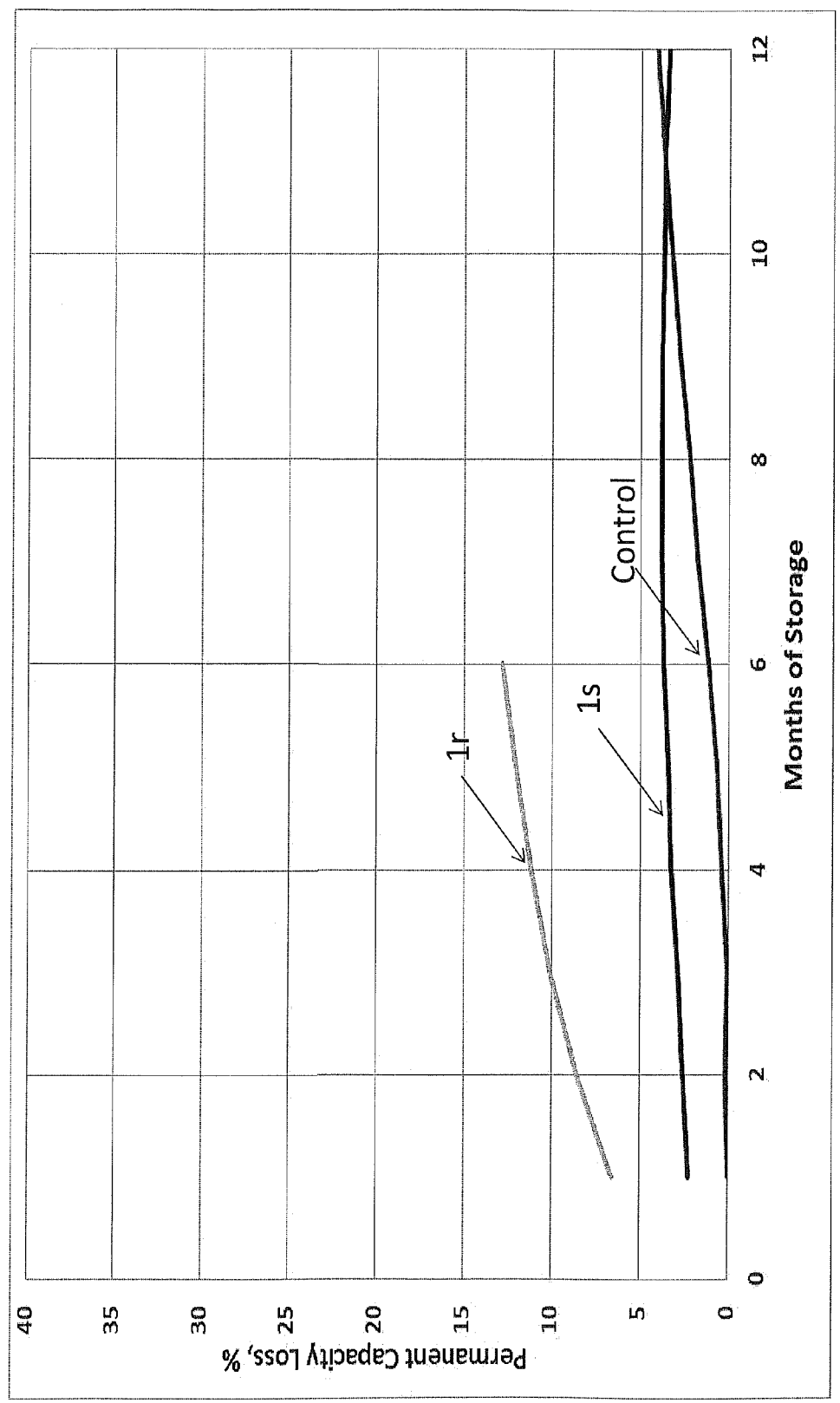
FIG. 8 is a plot of percentage of permanent capacity loss versus months of storage at 30 degree C. for battery 1r formed with formation protocol 1, battery is formed with formation protocol 3, and a control battery.

Two pouch cell batteries 1r and 1s designed to have roughly 1 Ah total capacity formed from composition 2 of example 1 and graphitic carbon counter electrode as well as a control battery were formed following the procedure outlined above. The control battery was a cylindrical battery essentially as described in Example 4 of published U.S. patent application 2011/0017528 to Kumar et al., entitled "Lithium Ion Batteries With Long Cycling Performance," incorporated herein by reference. Battery 1r was activated following formation protocol 1 at 4.35V while battery is was activated following formation protocol 3 at 4.3V. The batteries were then stored at 4.35V (battery 1r), 4.24V (battery is) and 4.2V (Control battery) at 30° C. for 12 months. The batteries were cycled once every month to determine the battery capacity, and then returned to an 80% state of charge for continued storage. The permanent capacity loss of the batteries was tested during the 12 month periods, and the results are plotted in FIG. 8. Battery 1r showed the fastest permanent capacity loss. Battery is exhibited a significant permanent capacity loss over the first month, but a very slow decay after the first month that then extrapolates into a long calendar life. The calendar life for battery 1s is expected to be about 14 years at 30 degree C. based on a linear extrapolation excluding the 0 month data point. The calendar life for the control battery is expected to be about 4 years at 30 degree C. based on a similar linear extrapolation.

Figure 9:
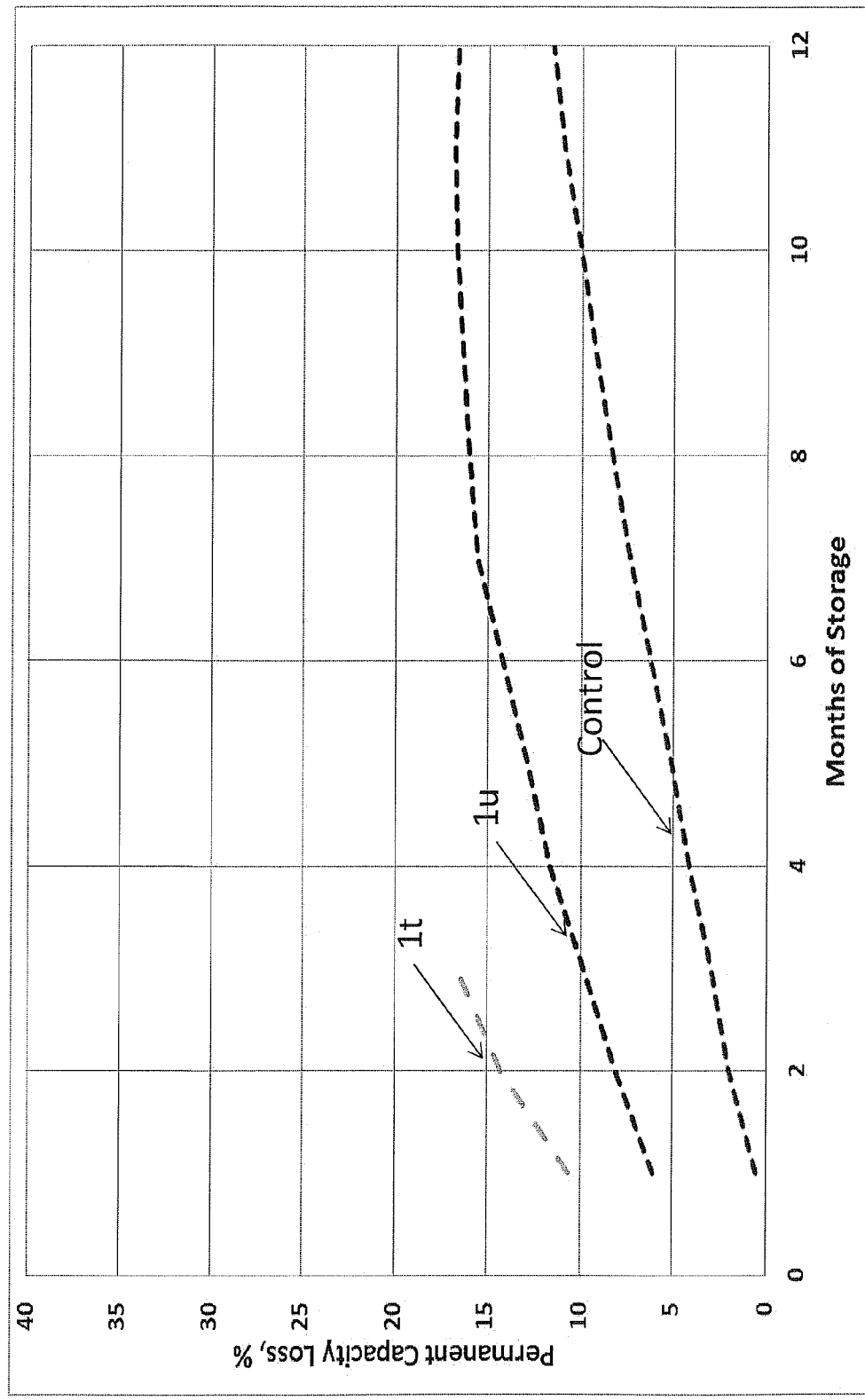
FIG. 9 is a plot of percentage of permanent capacity loss versus months of storage at 45 degree C. for battery 1t formed with formation protocol 1, battery 1u formed with formation protocol 3, and a control battery.

Two additional pouch cell batteries 1t and 1u designed to have roughly 1 Ah total capacity were formed from composition 2 of example 1 and graphitic carbon counter electrode as well as a control battery were formed following the procedure outlined above. The control battery comprised a cylindrical battery as described above. Battery 1t was activated following formation protocol 1 at 4.6V while battery 1u was activated with formation protocol 3 at 4.3V. The batteries were then stored at 4.3V (battery 1t), 4.24V (battery 1u) and 4.2V (control battery) at 45° C. for 12 months. Battery 1t leaked after 4 months of store, and the failure of this battery is suggestive of poor storage for fully activated batteries out to 4.6V, possibly due to significant oxygen release during formation. The permanent capacity loss of the batteries was tested during the 12 month periods and the results were plotted in FIG. 9. The calendar life for battery 1u is expected to be about 2.2 years at 45 degree C. based on an extrapolation of the storage performance over the last few months of the year. Battery 1u experienced significant permanent capacity loss over the first 7 months at 45 degrees, but then the performance decay flattened significantly for later storage times so that a 20% capacity loss was not experienced based on extrapolation until a reasonable period of time. The calendar life for the control battery is expected to be about 1.2 years at 45 degree C. All calendar life estimates were based on the last 5 months (8-12) of the 12 month data.

Example 9

Cycling Performance of Activated Batteries at Different Temperatures

Batteries were activated with different formation protocols to evaluate the cycling performance of the batteries under accelerated charge/discharge conditions and at normal and elevated temperatures.

Figure 10:
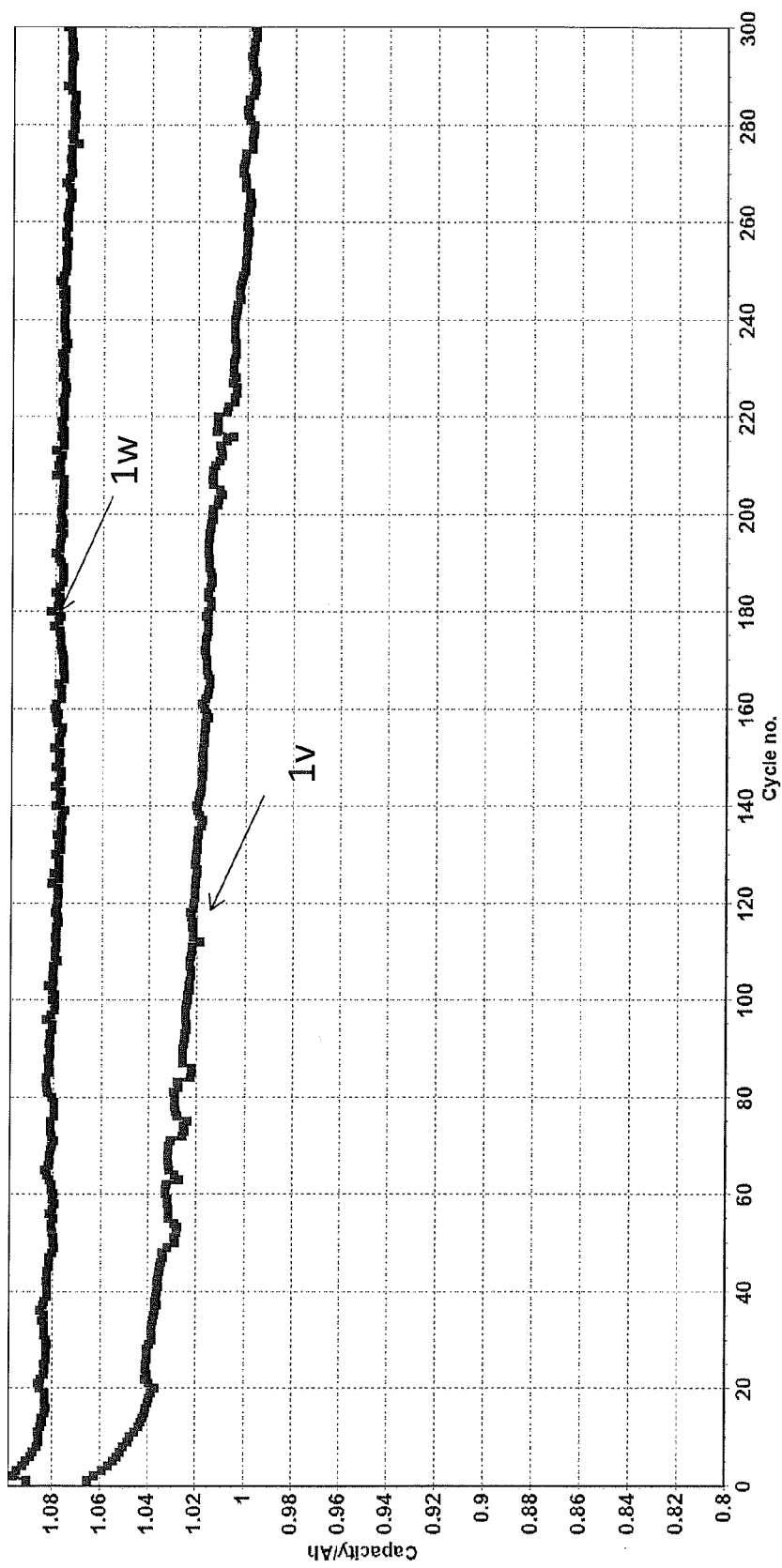
FIG. 10 is a plot of capacity versus cycle number of batteries 1v and 1w activated with formation protocols 1 and 2 respectively at room temperature.

Pouch cell batteries 1v and 1w formed from composition 1 of example 1 and graphitic carbon counter electrode were formed following the procedures outlined above. Batteries 1v and 1w were activated following formation protocols 1 and 2, respectively. The batteries were then cycled at 1 C for charge and 2 C for discharge between 4.35V and 2.5V respectively at room temperature and the cycling results were plotted in FIG. 10. As shown in FIG. 10, battery 1v activated with formation protocol 1 is shown to lose specific capacity much faster than battery 1w that was activated with formation protocol 2.

Figure 11:
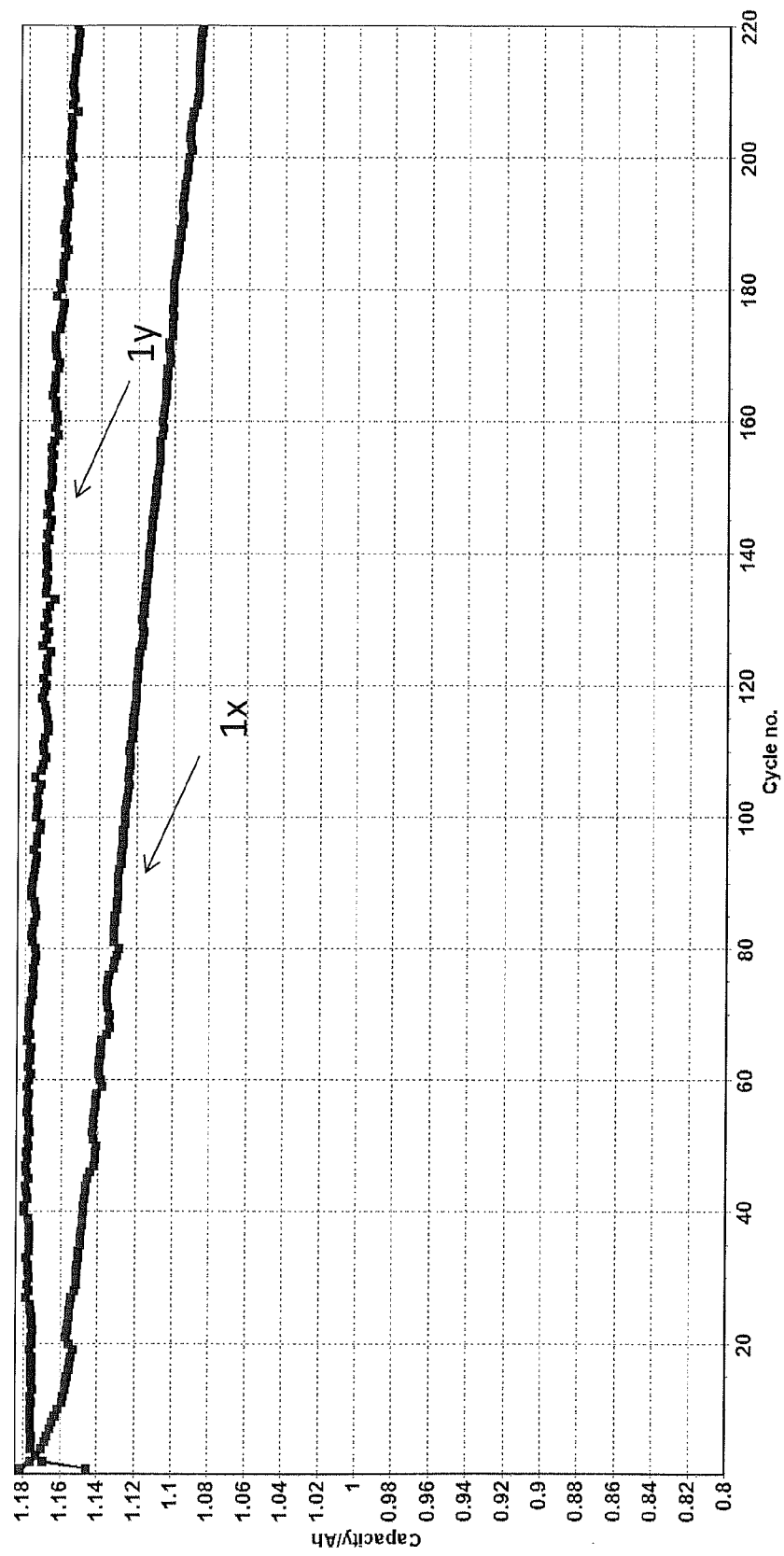
FIG. 11 is a plot of capacity versus cycle number of batteries 1x and 1y activated with formation protocols 1 and 2 respectively at 45 degree C.

Pouch cell batteries 1x and 1y formed from composition 1 of example 1 and graphitic carbon counter electrode were formed following the procedures outlined above. Batteries 1x and 1y were activated following formation protocols 1 and 2, respectively. The batteries were then cycled at 1 C for charge and 2 C for discharge between 4.35V and 2.5V respectively at 45° C. and the cycling results were plotted in FIG. 11. As shown in FIG. 11, battery 1x activated with formation protocol 1 is shown to lose specific capacity much faster than battery 1y that was activated with formation protocol 2.

Example 10

Evaluation of Rest Period of Batteries Activated with Formation Protocol 2

Batteries activated with formation protocol 2 were evaluated with respect to performance based on the length of the rest period. The rest period is the storage period after initially charging the batteries to 4.2V and before charging the batteries to 4.35V.

Figure 12:
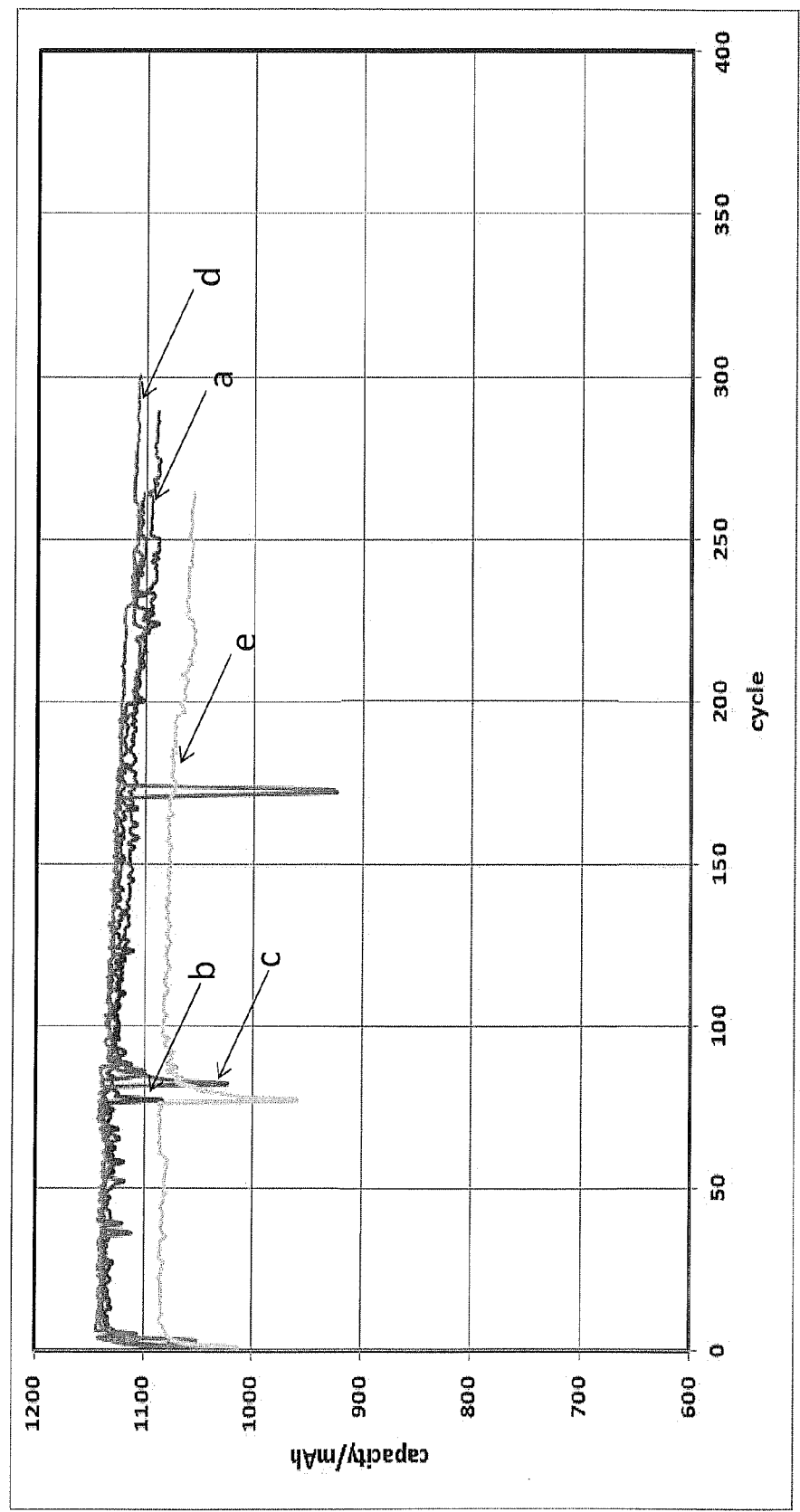
FIG. 12 is a plot of capacity versus cycle number of batteries a, b, c, d, e activated with formation protocol 2 and different second aging periods.

Pouch cell batteries a, b, c, d, and e designed to have roughly 1 Ah total capacity comprising composition 2 of example 1 and graphitic carbon counter electrode were formed following the procedures outlined above. Batteries a-e were initially charged to 4.2V followed by a open circuit rest period of 0, 2, 4, 6, and 10 days respectively before being charged to 4.35V. The batteries were then cycled for up to 300 cycles at 1 C charge and 2 C discharge from 4.35V to 2V and the cycling results were plotted in FIG. 12. As shown in FIG. 12, batteries b-d appeared to exhibit comparable cycling performance. Battery a had slightly worse cycling performance and battery e showed significantly lower specific capacity with cycling.

Example 11

Effect of Electrolyte Additive in Batteries Activated with Formation Protocol 2

The electrical performance of batteries with or without a lithium salt electrolyte additive was evaluated during the course of formation protocol 2.

Figure 13:
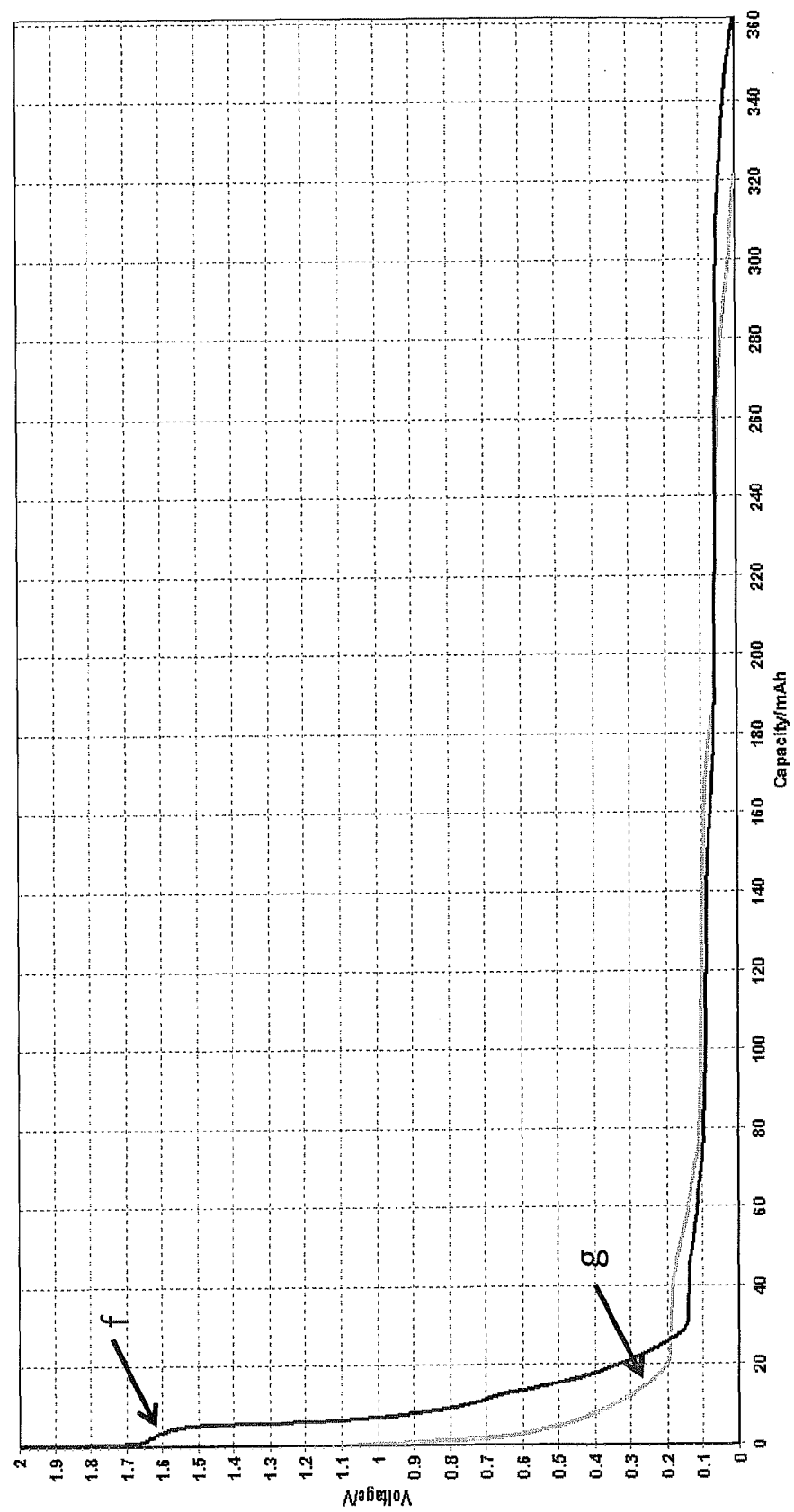
FIG. 13 is a plot of voltage versus capacity of batteries f and g formed with a graphitic carbon electrode and a lithium counter electrode with and without lithium salt additive respectively.

Specifically, coin cell batteries f and g were constructed with graphitic carbon active material, as described above for negative electrodes for batteries formed with lithium rich metal oxides, and a lithium counter electrode with and without the lithium salt electrolyte additive along with the electrolyte described above. The voltage versus capacity performance of the batteries f and g were measured and recorded in FIG. 13. As shown in FIG. 13, battery f with additive appear to have a high initial voltage of about 1.6 V when the capacity of the battery is essentially zero, indicating the additive reduction potential on the anode of the battery is about 1.6V. The battery without the additive exhibited initial electrolyte reduction at a potential of about 0.9V. Reduction of the electrolyte with or without the lithium salt additive is generally attributable to SEI layer formation.

Figure 14:
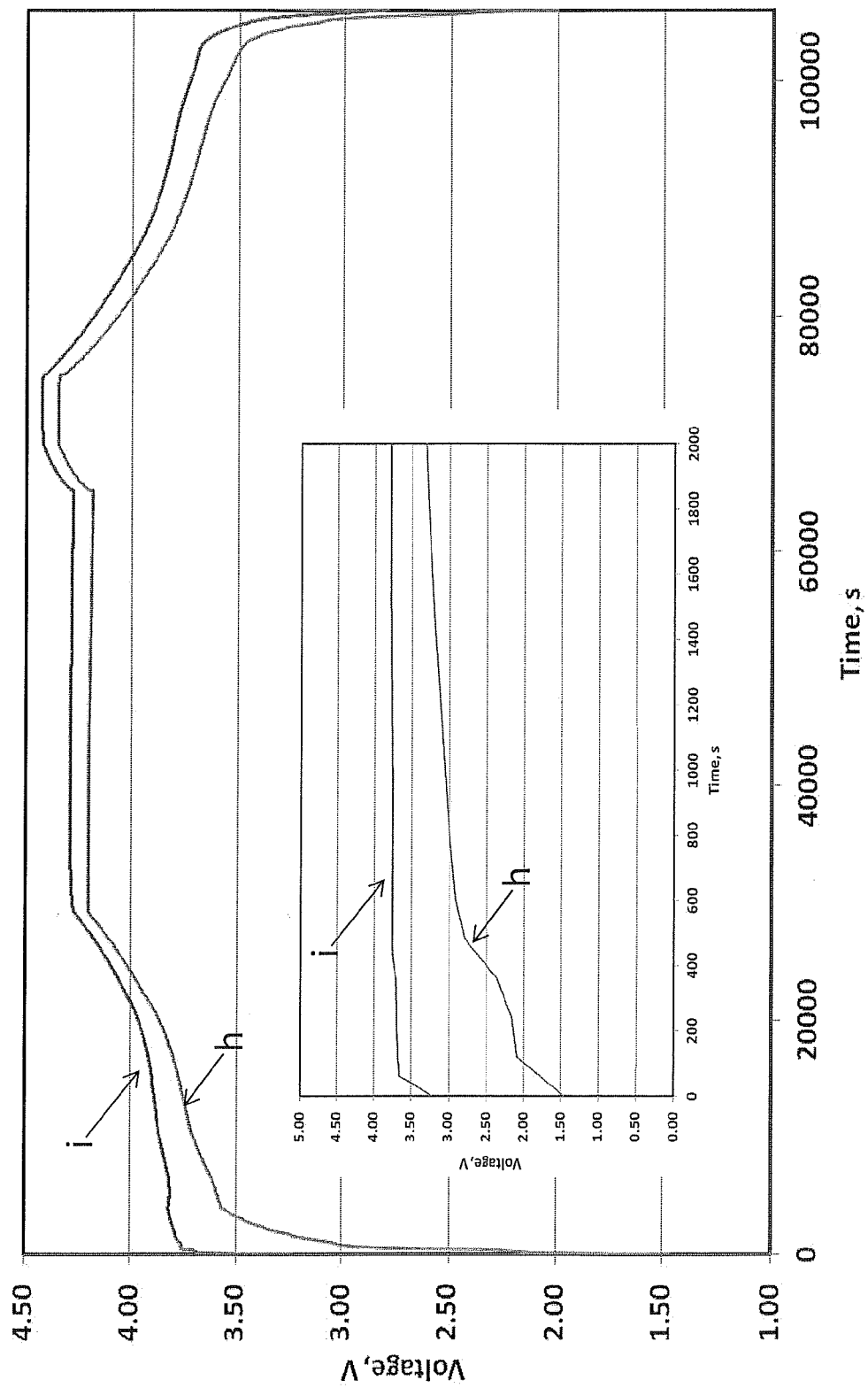
FIG. 14 is a plot of voltages of a three electrode battery during the course of a two step formation protocol.

A three electrode battery was assembled using a commercial test cell (HS-3E) configured for three electrode use with a cathode made from composition 1 as the working electrode, graphite as the counter electrode and lithium as the reference electrode in an electrolyte that comprises the lithium salt electrolyte additive. The voltages of the battery during the two step formation protocol when cycled between the cathode and graphite or between the cathode and lithium were measured and recorded in FIG. 14 as h and i, respectively. The portion of FIG. 14 between zero and 2000 seconds was enlarged and shown as an insert. As indicated in the insert, when cycled between the cathode and graphite the additive was reduced at about 2.1V while when cycled between the cathode and lithium the additive was reduced at about 3.7V. Once the SEI layer is formed, the difference between the battery potential and the positive electrode potential becomes due to the graphite potential, which is relatively low against lithium. Thus, the difference between the battery potential and positive electrode potential can be used to evaluate when the SEI layer is essentially formed in association with the anode active material, which seems to be completed at some point during the first charge step.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method for the formation of a lithium ion secondary battery comprising a lithium rich metal oxide composition, a negative electrode, a separator between the positive electrode and negative electrode, and an electrolyte comprising lithium ions, the method comprising:
    performing a first charge of the battery to a voltage from about 3.95 V to about 4.225V;
    after completing the first charge, holding the battery at an open circuit for a rest period of at least about 6 hours; and
    performing a second charge after the completion of the rest period to a voltage from about 4.275V to about 4.39V.

2. The method of claim 1 wherein the first charge of the battery is to a voltage from about 4.15V to about 4.22V.

3. The method of claim 1 wherein the battery is held at an open circuit rest period from about 8 hours to about 8 days.

4. The method of claim 1 wherein the second charge after the rest period is to a voltage from about 4.28V to about 4.38V.

5. A method for the formation of a lithium ion secondary battery comprising a lithium rich metal oxide composition, a negative electrode, a separator between the positive electrode and negative electrode, and an electrolyte comprising lithium ions, the method comprising:
    performing a first charge of the battery to a voltage from about 2.1 to about 4.225V;
    after completing the first charge, holding the battery at an open circuit for a rest period of at least about 6 hours; and
    performing a second charge after the completion of the rest period to a voltage from about 4.275V to about 4.39V,
    wherein the lithium rich metal oxide is approximately represented by x $Li_2MnO_3 \cdot (1-x)LiNi_uMn_vCo_wA_yO_2$, wherein z=0 and the stoichiometry defines x, u, v, w and y in terms of b, $\alpha$, $\beta$, $\gamma$ and $\delta$ and wherein $0.125 \leq x \leq 0.325$.

6. The method of claim 1 wherein the negative electrode comprises graphitic carbon.

7. The method of claim 1 wherein after charging the battery to 4.35V and storing the battery at an open circuit voltage for one week, the negative electrode of the battery comprises no more than about 125 ppm of the combination of Mn, Co and Ni.

8. The method of claim 1 wherein after cycling for 2500 cycles between 4.24V to 2.73V at a 1 C Charge and 2 C discharge, the battery maintains at least 92% of capacity.

9. A method for the formation of a lithium ion secondary battery comprising a lithium rich metal oxide composition, a negative electrode, a separator between the positive electrode and negative electrode, and an electrolyte comprising lithium ions, the method comprising:
    performing a first charge of the battery to a voltage from about 2.1 V to about 4.225V;
    after completing the first charge, holding the battery at an open circuit for a rest period of at least about 6 hours; and
    performing a second charge after the completion of the rest period to a voltage from about 4.275V to about 4.39V,
    wherein the electrolyte comprises $LiPF_6$ and/or $LiBF_4$ at a total concentration from about 0.9M to about 2.5M and a solvent comprising ethylene carbonate and an organic solvent comprising dimethyl carbonate, methyl ethyl carbonate, $\gamma$-butyrolactone, $\gamma$-valerolactone or a combination thereof.

10. The method of claim 9 wherein the electrolyte further comprises a lithium salt additive.

11. A lithium ion battery comprising a positive electrode comprising an active material, a negative electrode, a separator between the positive electrode and negative electrode, and an electrolyte comprising lithium ions, wherein the positive electrode active material comprises a lithium rich metal oxide that can be approximately represented by the formula $Li_{1+b}Ni_\alpha Mn_\beta Co_\gamma A_\delta O_{2-z}F_z$, where b ranges from about 0.01 to about 0.3, $\alpha$ ranges from 0 to about 0.4, $\beta$ range from about 0.2 to about 0.65, $\gamma$ ranges from about 0 to about 0.46, $\delta$ ranges from about 0.001 to about 0.15, and z ranges from 0 to about 0.2 with the proviso that both $\alpha$ and $\gamma$ are not zero, and where A is a metal different from Ni, Mn and Co or a combination thereof, and wherein after charging the battery to 4.35V at a rate of C/10, storing the charged battery with an open circuit for a week at room temperature and fully discharging the battery, the negative electrode comprises no more than about 150 ppm by weight manganese.

12. The lithium ion battery of claim 11 wherein after charging to 4.35V and storing the battery in an open circuit voltage for 1 week, the negative electrode comprises no more than about 135 ppm by weight manganese.

13. The lithium ion battery of claim 11 wherein after charging to 4.35V and storing the battery at an open circuit voltage for a week, the negative electrode comprises no more than about 200 ppm of the combination of Mn, Co and Ni.

14. A lithium ion battery comprising:
a positive electrode comprising a positive electrode active material that comprises a lithium rich metal oxide;
a negative electrode comprising a lithium intercalation/alloying composition;
a non-aqueous electrolyte comprising lithium ions;
a separator between the negative electrode and the positive electrode; and
wherein the battery has been cycled through a formation cycle and wherein at the 200th cycle, the battery has a specific discharge capacity based on the mass of the positive electrode active composition of at least about 140 mAh/g at a discharge rate of 1 C from 4.35V to 2.0V that is at least about 97% of the 5th cycle specific discharge capacity.

15. The lithium ion battery of claim 14 wherein the lithium rich metal oxide is approximately represented by x Li$_2$MnO$_3$·(1−x)LiNi$_u$Mn$_v$Co$_w$A$_y$O$_2$, wherein z=0 and the stoichiometry defines x, u, v, w and y in terms of b, α, β, γ and δ.

16. The lithium ion battery of claim 15 wherein 0.125≤x≤0.325.

17. The lithium ion battery of claim 14 wherein the negative electrode comprises graphitic carbon.

18. The lithium ion battery of claim 14 wherein the electrolyte comprises LiPF$_6$ and/or LiBF$_4$ at a total concentration from about 0.9M to about 2.5M and a solvent comprising ethylene carbonate and an organic solvent comprising dimethyl carbonate, methyl ethyl carbonate, γ-butyrolactone, γ-valerolactone or a combination thereof.

19. The lithium ion battery of claim 14 wherein the positive electrode active material has a discharge specific capacity at a rate of 2 C from 4.35V to 2.5V at the 10th discharge cycle that is at least about 140 mAh/g and that is at least 87.5% of the discharge specific capacity at a rate of C/5 from 4.35V to 2.5V at the 11th discharge cycle.

20. The lithium ion battery of claim 14 wherein the positive electrode active material has a discharge specific capacity at a rate of C/3 from 4.35V to 2.5V at the 5th discharge cycle that is at least about 160 mAh/g and having a calendar life at 85% state of charge at 30 degrees C. of at least about 2 years based on discharge capacity decay of no more than 20%.

21. The lithium ion battery of claim 14 wherein the positive electrode active material has a stabilization coating over the lithium rich metal oxide.

22. The lithium ion battery of claim 14 having a discharge energy density of at least about 150 Wh/kg at a discharge rate of C/3 from 4.35V to 2V.

23. A lithium ion battery comprising a positive electrode comprising an active material, a negative electrode, a separator between the positive electrode and negative electrode, and an electrolyte comprising lithium ions, wherein the positive electrode active material comprises a lithium rich metal oxide that can be approximately represented by the formula Li$_{1+b}$Ni$_\alpha$Mn$_\beta$Co$_\gamma$A$_\delta$O$_{2-z}$F$_z$, where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof, and wherein the positive electrode active material has a discharge specific capacity at a rate of 2 C from 4.35V to 2.5V at the 10th discharge cycle that is at least about 140 mAh/g and that is at least 87.5% of the discharge specific capacity at a rate of C/5 from 4.35V to 2.5V at the 11th discharge cycle.

24. The lithium ion battery of claim 23 wherein the positive electrode active material has a discharge specific capacity at a rate of 2 C from 4.35V to 2.5V at the 10th discharge cycle that is at least 89% to about 92.5% of the discharge specific capacity at a rate of C/5 from 4.35V to 2.5V at the 11th discharge cycle.

25. The lithium ion battery of claim 23 wherein the lithium rich metal oxide is approximately represented by x Li$_2$MnO$_3$·(1−x)LiNi$_u$Mn$_v$Co$_w$A$_y$O$_2$, wherein z=0 and the stoichiometry defines x, u, v, w and y in terms of b, α, β, γ and δ, and wherein 0.125≤x≤0.325.

26. The lithium ion battery of claim 23 wherein the negative electrode comprises graphitic carbon.

27. A lithium ion battery comprising a positive electrode comprising a positive electrode active material that comprises a lithium rich metal oxide, a negative electrode, a separator between the positive electrode and negative electrode, and an electrolyte comprising lithium ions, wherein the lithium rich metal oxide can be approximately represented by the formula Li$_{1+b}$Ni$_\alpha$Mn$_\beta$Co$_\gamma$A$_\delta$O$_{2-z}$F$_z$, where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof, and wherein the positive electrode active material has a discharge specific capacity at a rate of C/3 from 4.35V to 2.5V at the 5th discharge cycle that is at least about 160 mAh/g and having a calendar life at an 85% state of charge at 30 degrees C. of at least about 2 years based on discharge capacity decay of no more than 20%.

28. The lithium ion battery of claim 27 wherein the positive electrode material has a calendar life at 30 degree C. of at least about 3 years based on discharge capacity decay of no more than 20%.

29. The lithium ion battery of claim 27 wherein the lithium rich metal oxide is approximately represented by x Li$_2$MnO$_3$·(1−x)LiNi$_u$Mn$_v$Co$_w$A$_y$O$_2$, wherein z=0 and the stoichiometry defines x, u, v, w and y in terms of b, α, β, γ and δ, and wherein 0.125≤x≤0.325.

30. The lithium ion battery of claim 27 wherein the negative electrode comprises graphitic carbon.

* * * * *